(12) United States Patent
Ngo et al.

(10) Patent No.: US 9,699,786 B2
(45) Date of Patent: Jul. 4, 2017

(54) METHOD AND APPARATUS FOR INTEGRATING RADIO AGENT DATA IN NETWORK ORGANIZATION OF DYNAMIC CHANNEL SELECTION IN WIRELESS NETWORKS

(71) Applicant: NETWORK PERFORMANCE RESEARCH GROUP LLC, San Jose, CA (US)

(72) Inventors: Terry F K Ngo, Bellevue, WA (US); Seung Baek Yi, Norwich, VT (US); Erick Kurniawan, San Francisco, CA (US); Kun Ting Tsai, Fremont, CA (US)

(73) Assignee: Network Performance Research Group LLC, San Jose, CA (US)

( * ) Notice: Subject to any disclaimer, the term of this patent is extended or adjusted under 35 U.S.C. 154(b) by 0 days.

(21) Appl. No.: 15/171,911

(22) Filed: Jun. 2, 2016

(65) Prior Publication Data

US 2017/0070993 A1 Mar. 9, 2017

Related U.S. Application Data

(60) Provisional application No. 62/215,079, filed on Sep. 7, 2015.

(51) Int. Cl.
*H04L 12/28* (2006.01)
*H04W 72/04* (2009.01)
(Continued)

(52) U.S. Cl.
CPC ......... *H04W 72/0453* (2013.01); *H04L 67/10* (2013.01); *H04W 16/14* (2013.01); *H04W 84/12* (2013.01); *H04W 84/18* (2013.01)

(58) Field of Classification Search
USPC ................................ 370/252, 329, 386, 430
See application file for complete search history.

(56) References Cited

U.S. PATENT DOCUMENTS 7,548,750 B2  6/2009  Kruys et al.
7,606,193 B2  10/2009  McFarland et al.
(Continued)

FOREIGN PATENT DOCUMENTS

EP    2512169 A1    10/2012
EP    1925108 B1    3/2014
(Continued)

OTHER PUBLICATIONS

Notice of Allowance dated Jul. 19, 2016 for U.S. Appl. No. 15/085,573, 27 pages.
(Continued)

*Primary Examiner* — John Pezzlo
(74) *Attorney, Agent, or Firm* — Amin, Turocy & Watson, LLP

(57) ABSTRACT

The present invention relates to wireless networks and more specifically to a method and apparatus for integrating spectrum data from a plurality of autonomous radio agents with a cloud-based data fusion and computing element that enables network self-organization and adaptive control of dynamic frequency selection in 802.11 ac/n and LTE-U networks. In one embodiment, the present invention provides a cloud intelligence engine communicatively coupled to a plurality of multi-channel DFS masters that is configured to receive spectral information from the plurality of multi-channel DFS masters, integrate the spectral information with other spectral information to generate integrated spectral information, and determine communication channels for the plurality of multi-channel DFS masters based at least on the integrated spectral information.

20 Claims, 12 Drawing Sheets

(51) Int. Cl.
*H04W 16/14* (2009.01)
*H04L 29/08* (2006.01)
*H04J 1/16* (2006.01)
*H04W 84/12* (2009.01)
*H04W 84/18* (2009.01)

(56) References Cited

U.S. PATENT DOCUMENTS

| | | | |
|---|---|---|---|
| 7,813,744 | B2 | 10/2010 | Johnson |
| 8,213,942 | B2 | 7/2012 | Likar et al. |
| 8,239,337 | B2 | 8/2012 | Madani |
| 8,260,357 | B2 | 9/2012 | Likar et al. |
| 8,472,334 | B2 | 6/2013 | Likar et al. |
| 8,483,059 | B2 | 7/2013 | Likar et al. |
| 8,565,106 | B2 | 10/2013 | Likar et al. |
| 8,654,782 | B2 | 2/2014 | Meil et al. |
| 8,699,341 | B2 | 4/2014 | Likar et al. |
| 8,867,490 | B1 | 10/2014 | Krishna et al. |
| 8,879,996 | B2 | 11/2014 | Kenney et al. |
| 8,885,511 | B2 | 11/2014 | Likar et al. |
| 9,060,289 | B2 | 6/2015 | Chandrasekhar et al. |
| 9,066,251 | B2 | 6/2015 | Madan et al. |
| 9,131,391 | B2 | 9/2015 | Madan et al. |
| 9,131,392 | B2 | 9/2015 | Madan et al. |
| 9,131,504 | B2 | 9/2015 | Kenney et al. |
| 9,439,197 | B1 | 9/2016 | Ngo et al. |
| 2002/0116380 | A1 | 8/2002 | Chen et al. |
| 2003/0107512 | A1 | 6/2003 | McFarland et al. |
| 2003/0181213 | A1 | 9/2003 | Sugar et al. |
| 2004/0033789 | A1 | 2/2004 | Tsien |
| 2004/0151137 | A1 | 8/2004 | McFarland et al. |
| 2004/0156336 | A1 | 8/2004 | McFarland et al. |
| 2004/0242188 | A1 | 12/2004 | Uchida et al. |
| 2005/0059364 | A1 | 3/2005 | Hansen et al. |
| 2005/0192016 | A1 | 9/2005 | Zimmermann et al. |
| 2005/0215266 | A1 | 9/2005 | Tsien et al. |
| 2006/0082489 | A1 | 4/2006 | Liu et al. |
| 2007/0060065 | A1 | 3/2007 | Kruys et al. |
| 2008/0089280 | A1 | 4/2008 | Hu |
| 2009/0077620 | A1 | 3/2009 | Ravi et al. |
| 2009/0116411 | A1 | 5/2009 | Castagnoli et al. |
| 2009/0160696 | A1 | 6/2009 | Pare et al. |
| 2009/0201851 | A1 | 8/2009 | Kruys et al. |
| 2010/0061289 | A1 | 3/2010 | Mun et al. |
| 2010/0216480 | A1 | 8/2010 | Park et al. |
| 2010/0271948 | A1 | 10/2010 | Challapali et al. |
| 2012/0258749 | A1 | 10/2012 | Lenzini et al. |
| 2012/0300759 | A1 | 11/2012 | Patanapongpibul et al. |
| 2013/0072106 | A1 | 3/2013 | Koskela et al. |
| 2013/0201928 | A1 | 8/2013 | Kim et al. |
| 2013/0252640 | A1 | 9/2013 | Kenney et al. |
| 2013/0314267 | A1 | 11/2013 | Kenney et al. |
| 2014/0253361 | A1 | 9/2014 | Rezk et al. |
| 2014/0301328 | A1 | 10/2014 | Yacovitch |
| 2014/0328286 | A1 | 11/2014 | Crowle et al. |
| 2014/0349669 | A1 | 11/2014 | Qi et al. |
| 2014/0362782 | A1 | 12/2014 | Yuk et al. |
| 2015/0023271 | A1 | 1/2015 | Nakano |
| 2015/0063321 | A1 | 3/2015 | Sadek et al. |
| 2015/0208330 | A1 | 7/2015 | Park et al. |
| 2015/0271829 | A1 | 9/2015 | Amini et al. |
| 2016/0014613 | A1 | 1/2016 | Ponnampalam et al. |
| 2016/0157168 | A1 | 6/2016 | Xue et al. |
| 2016/0261657 | A1 | 9/2016 | Bruhn et al. |
| 2016/0345323 | A1 | 11/2016 | Krishnamoorthy et al. |
| 2017/0026845 | A1 | 1/2017 | Garg et al. |
| 2017/0041949 | A1 | 2/2017 | Ngo et al. |
| 2017/0041954 | A1* | 2/2017 | Tsai ................. H04W 16/14 |
| 2017/0079007 | A1* | 3/2017 | Carbajal ............ H04W 64/006 |

FOREIGN PATENT DOCUMENTS

| | | |
|---|---|---|
| WO | 2007032790 A2 | 3/2007 |
| WO | 2007032790 A3 | 4/2009 |
| WO | 2014176503 | 10/2014 |
| WO | 2014190004 A1 | 11/2014 |

OTHER PUBLICATIONS

Office Action for U.S. Appl. No. 14/920,568, dated Sep. 30, 2016, 28 pages.
Office Action for U.S. Appl. No. 14/920,568, dated Mar. 29, 2016, 29 pages.
Office Action for U.S. Appl. No. 15/085,573, dated Jun. 24, 2016, 15 pages.
Extended European Search Report for EP Patent Application Serial No. 16187611.5, dated Jan. 30, 2017, 8 pages.
Extended European Search Report for EP Patent Application Serial No. 16182722.5, dated Dec. 15, 2016, 11 pages.
Kerry et al., "Liaison Statement on the Compatibility Between IEEE 802.11a and Radars in the Radiolocation and Radionavigation Service in the 5250-5350 MHz and 5470-5725 MHz bands", Jan. 2001, IEEE, 6 pages.
Extended European Search Report for EP Patent Application Serial No. 16182672.2, dated Dec. 16, 2016, 8 pages.
Office Action for U.S. Appl. No. 15/214,437 dated Jan. 23, 2017, 33 pages.
Office Action for U.S. Appl. No. 14/920,568, dated Jan. 20, 2017, 26 pages.
Office Action for U.S. Appl. No. 15/259,386, dated Jan. 9, 2017, 37 Pages.
Office Action for U.S. Appl. No. 15/171,911, dated Feb. 28, 2017, 34 Pages.
Office Action for U.S. Appl. No. 15/263,985, dated Mar. 7, 2017, 33 Pages.
Office Action for U.S. Appl. No. 15/428,658, dated May 10, 2017, 20 pages.
Office Action for U.S. Appl. No. 15/416,568. dated May 18, 2017, 39 pages.
European Office Action for EP Patent Application Serial No. 16182722.5, dated Feb. 13, 2017, 2 pages.

* cited by examiner

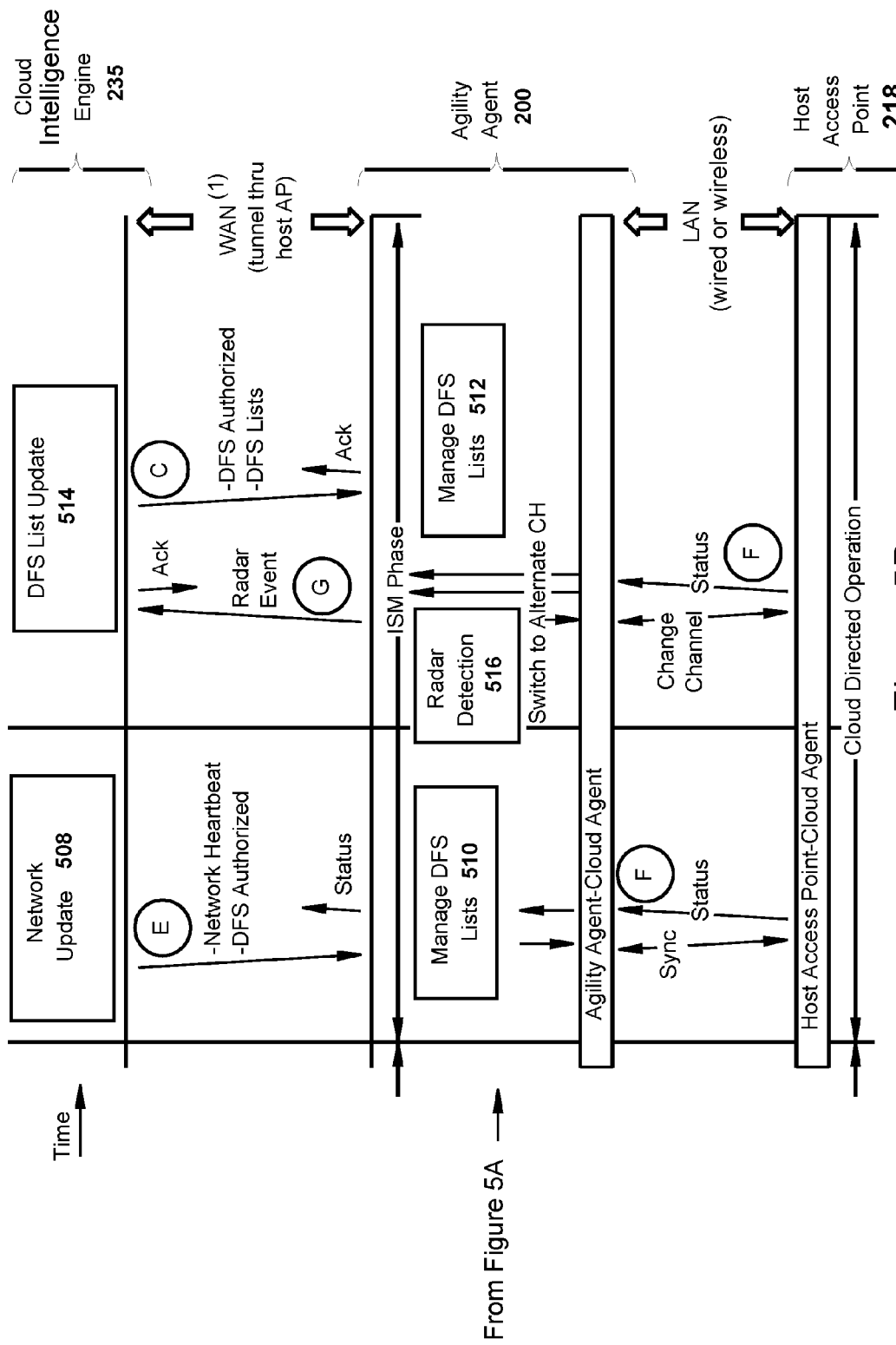

METHOD AND APPARATUS FOR INTEGRATING RADIO AGENT DATA IN NETWORK ORGANIZATION OF DYNAMIC CHANNEL SELECTION IN WIRELESS NETWORKS

CROSS-REFERENCE TO RELATED APPLICATIONS

This application claims priority to U.S. Provisional Patent Application No. 62/215,079 titled METHOD AND APPARATUS FOR INTEGRATING RADIO AGENT DATA IN NETWORK ORGANIZATION OF DYNAMIC CHANNEL SELECTION IN WIRELESS NETWORKS and filed on Sep. 7, 2015, the disclosure of which is hereby incorporated herein by reference in its entirety.

BACKGROUND

The present invention relates to wireless networks and more specifically to a method and apparatus for integrating spectrum data from a plurality of autonomous radio agents by a cloud-based data fusion and computing element, thereby enabling network self-organization and adaptive control of dynamic frequency selection in 802.11 ac/n and LTE-U networks. Embodiments of the present invention include a cloud-based data fusion and computation element coupled to a plurality of wireless agility agents in a split-intelligence architecture wherein embedded radios in the agility agents collect real-time spectral information continuously, such as radar detection information, and measurements of interference, traffic, signatures of neighboring devices, and other localized over-the-air information.

Wi-Fi networks are crucial to today's portable modern life. Wi-Fi is the preferred network in the growing Internet-of-Things (IoT). But, the technology behind current Wi-Fi has changed little in the last ten years. The Wi-Fi network and the associated unlicensed spectrum are currently managed in inefficient ways. For example, there is little or no coordination between individual networks and equipment from different manufacturers. Such networks generally employ primitive control algorithms that assume the network consists of "self-managed islands," a concept originally intended for low density and low traffic environments. The situation is far worse for home networks, which are assembled in completely chaotic ad hoc ways. The underlying media access protocols employed by 802.11 Wi-Fi are contention-based, meaning that a high frequency of collisions is assumed as there is no timing coordination of transmissions between access points and their associated clients. This coupled together with the fundamental need of 802.11 and LTE-U to co-exist in shared limited spectrum leads to significant instances of interference and growing problems of congestion. Further, with more and more connected devices becoming commonplace, the net result is growing congestion and slowed networks with unreliable connections.

Similarly, LTE-U networks operating in the same or similar unlicensed bands as 802.11ac/n Wi-Fi suffer similar congestion and unreliable connection issues and will often create congestion problems for existing Wi-Fi networks sharing the same channels. Additional bandwidth and better and more efficient utilization of spectrum is key to sustaining the usefulness of wireless networks including the Wi-Fi and LTE-U networks in a fast growing connected world.

Additional bandwidth and better and more efficient utilization of spectrum will be key to sustaining the usefulness of Wi-Fi and LTE-U networks in a fast growing connected world. The vast majority of Wi-Fi and LTE-U access point and small cell base station designs today are standalone devices, in keeping with the established concept of "self-managed islands." By necessity (physical size and economics), they contain limited radio resources, and limited embedded computing capabilities and memory. Consequently such standalone designs suffer from limited ability to sense their spectral environment and limited ability to adapt to changing conditions, resulting in inefficient utilization of spectrum and a growing problem.

SUMMARY

The present invention relates to wireless networks and more specifically to systems and methods for selecting available channels free of occupying signals from a plurality of radio frequency channels. In its preferred embodiments, the present invention utilizes a cloud-based data fusion and computation element connected to a plurality of wireless agility agents in a split-intelligence architecture wherein embedded radios in the agility agents collect real-time spectral information continuously, such as radar detection information, and measurements of interference, traffic, signatures of neighboring devices, and other localized over-the-air information.

Agility agents, due to their attachment to Wi-Fi access points and LTE-U small cell base stations, are by nature deployed over wide geographical areas in varying densities and often with overlapping coverage. The spectrum information detected by the embedded sensors in the agility agents, in particular the signatures of DFS radar and congestion conditions of local networks, represent multi-point overlapping measurements of the radio spectrum covering wide areas, or viewed a different way, the information represents spectrum measurements by random irregular arrays of sensors measuring radar and sources of interference and/or congestion from different angles.

The cloud intelligence engine collects the information from each agility agent and geo-tags, stores, filters, and integrates the data over time, and combines it together by data fusion techniques with information from a plurality of other agility agents distributed in space, and performs filtering and other post-processing on the collection with proprietary algorithms, and merges with other data from vetted sources (such as GIS—Geographical Information System, FAA, FCC, and DoD databases, etc.). The cloud intelligence engine having considerable processing capabilities and scalable memory and storage, is able to store the time-stamped spectrum information from each agility agent over very long periods of time, thus enabling the cloud intelligence engine to also integrate and correlate the signatures of DFS radar and congestion conditions of the local network over time as well as over geographic space. The overall system embodied by this invention can be viewed as a large wide-area closed control system.

Using this information, the cloud intelligence engine is able to compute network self-organization decisions to optimize the network, discover hidden nodes and hidden radar, and detect network impairment conditions such as interference, congestion & traffic etc. on a real time basis. The overall sensitivity (due to time-space integration, array processing), and accuracy and robustness (due to overlapping coverage, data fusion of other reliable sources) of the collective system embodied in this invention is significantly better and more reliable than any single access point or small cell base station, which is the current state.

Other embodiments and various examples, scenarios and implementations are described in more detail below. The following description and the drawings set forth certain illustrative embodiments of the specification. These embodiments are indicative, however, of but a few of the various ways in which the principles of the specification may be employed. Other advantages and novel features of the embodiments described will become apparent from the following detailed description of the specification when considered in conjunction with the drawings.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which:

FIG. 5B also illustrates exemplary signaling and interfacing between a cloud intelligence engine, an agility agent and a host access point, in accordance with the present invention.

DETAILED DESCRIPTION

Figure 1:
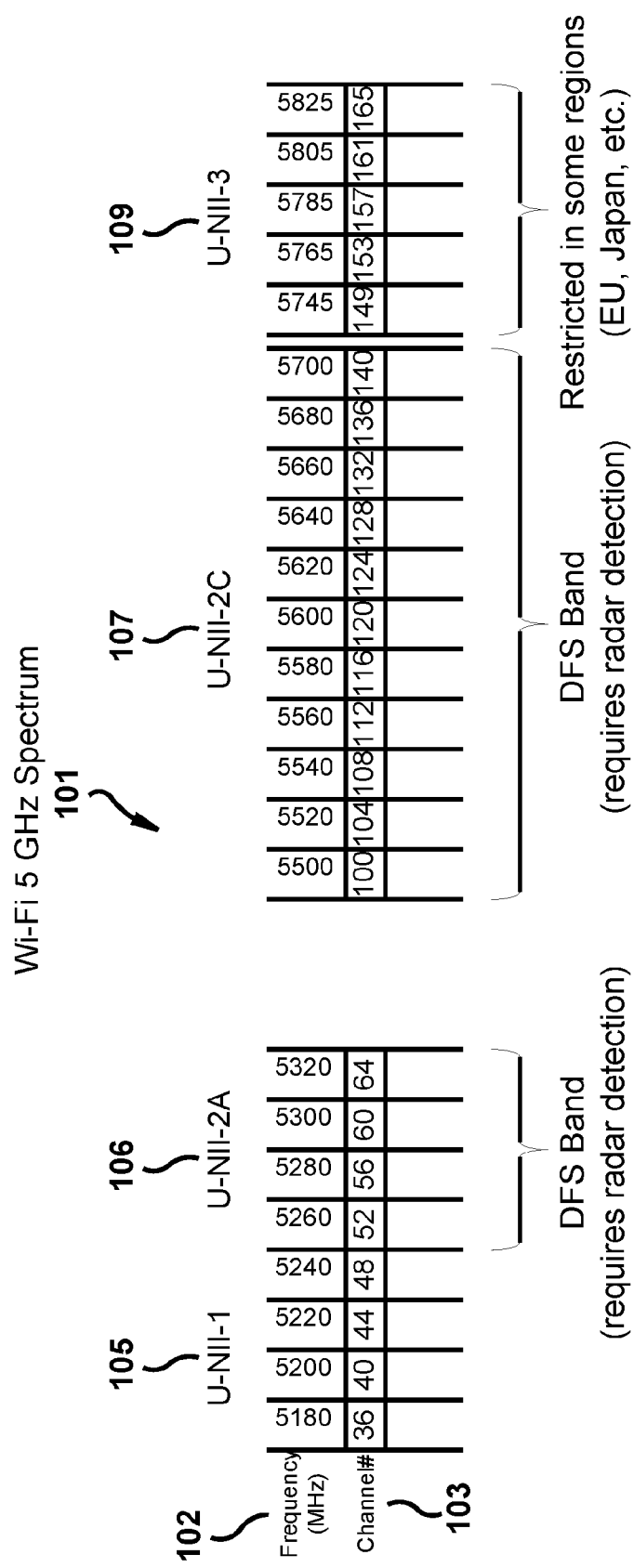
FIG. 1 illustrates portions of the 5 GHz Wi-Fi spectrum including portions that require active monitoring for radar signals.

The present invention relates to wireless networks and more specifically to a method and apparatus for integrating spectrum data from a plurality of autonomous radio agents by a cloud-based data fusion and computing element, thereby enabling network self-organization and adaptive control of dynamic frequency selection in 802.11 ac/n and LTE-U networks. Embodiments of the present invention provide a cloud-based data fusion and computation element communicatively coupled to a plurality of wireless agility agents in a split-intelligence architecture wherein embedded radios in the agility agents collect real-time spectral information continuously, such as radar detection information, and measurements of interference, traffic, signatures of neighboring devices, and other localized over-the-air information. The spectral information may be location-tagged and/or time-stamped.

In accordance with an implementation of the present invention, a cloud intelligence engine is communicatively coupled to a plurality of multi-channel DFS masters and configured to receive spectral information associated with a plurality of communication channels (e.g., a plurality of 5 GHz communication channels, a plurality of 5.9 GHz communication channels, a plurality of 3.5 GHz communication channels, etc.) from the plurality of multi-channel DFS masters via one or more network devices. The cloud intelligence engine is configured to integrate the spectral information with other spectral information to generate integrated spectral information, and determine communication channels for the plurality of multi-channel DFS masters from the plurality of communication channels based at least on the integrated spectral information. The integrated spectral information may also be location-tagged and/or time-stamped.

In accordance with another implementation of the present invention, a method provides for receiving with a cloud intelligence engine spectral information associated with a plurality of communication channels (e.g., a plurality of 5 GHz communication channels, a plurality of 5.9 GHz communication channels, a plurality of 3.5 GHz communication channels, etc.) from a plurality of multi-channel DFS masters via one or more network devices. The method further provides for integrating with the cloud intelligence engine the spectral information with other spectral information to generate integrated spectral information and determining communication channels for the plurality of multi-channel DFS masters from the plurality of communication channels based at least on the integrated spectral information.

In accordance with yet another implementation of the present invention, a system includes a cloud intelligence device coupled to a dynamic frequency selection (DFS) device and configured to receive spectral information associated with a plurality of radio channels based on an analysis of the plurality of radio channels from the DFS device via a wide area network. The cloud intelligence device is also configured to integrate the spectral information with other spectral information to generate integrated spectral information and to determine a radio channel for a device (e.g., an access point) from the plurality of radio channels based at least on the integrated spectral information. The integrated spectral information may also be location-tagged and/or time-stamped. The device is in communication with the DFS device via a network (e.g., a wireless network), and the other spectral information is generated by at least one other DFS device configured to analyze the plurality of radio channels. The network can be, for example, a local area network, a wide area network, an ad hoc network (e.g., an independent basic service set (IBSS) network), a peer-to-peer network (e.g., an IBSS peer-to-peer network), a short range wireless network (e.g., a Bluetooth network) and/or another type of network.

FIG. 1 illustrates portions of a 5 GHz Wi-Fi spectrum 101. FIG. 1 shows frequencies 102 and channels 103 that make up portions of the 5 GHz Wi-Fi spectrum 101. The channels 103 of the GHz Wi-Fi spectrum 101 may be a plurality of 5 GHz communication channels (e.g., a plurality of 5 GHz radio channels). A U-NII band is a Federal Communications Commission (FCC) regulatory domain for 5-GHz wireless devices and is part of the radio frequency spectrum used by IEEE 802.11ac/n devices and by many wireless internet service providers. The U-NII band operates over four ranges. For example, a U-NII-1 band 105 covers the 5.15-5.25 GHz range of the 5 GHz Wi-Fi spectrum 101, a U-NII-2A band 106 covers the 5.25-5.35 GHz range of the 5 GHz Wi-Fi spectrum 101, a U-NII-2C band 107 covers the 5.47-5.725 GHz range of the 5 GHz Wi-Fi spectrum 101, and a U-NII-3 band 109 covers the 5.725-5.850 GHz range of the 5 GHz Wi-Fi spectrum 101. The U-NII-2A band 106 is subject to DFS radar detection and avoidance requirements. The U-NII-2C band 107 is also subject to DFS radar detection and avoidance requirements. Use of the U-NII-3 band 109 is restricted in some jurisdictions like the European Union and Japan.

When used in an 802.11ac/n or LTE-U wireless network, an agility agent connected to the cloud intelligence engine of the present invention functions as an autonomous DFS master device. In contrast to conventional DFS master devices, the agility agent is not an access point or router, but rather the agility agent is a standalone wireless device employing inventive scanning techniques described herein that provide DFS scan capabilities across multiple channels, enabling one or more access point devices and peer-to-peer client devices to exploit simultaneous multiple DFS channels. The standalone autonomous DFS master may be incorporated into another device such as an access point, LTE-U host, base station, cell, or small cell, media or content streamer, speaker, television, mobile phone, mobile router, software access point device, or peer to peer device but does not itself provide network access to client devices. In particular, in the event of a radar event or a false-detect, the enabled access point and clients or wireless device are able to move automatically, predictively and very quickly to another DFS channel.

Figure 2:
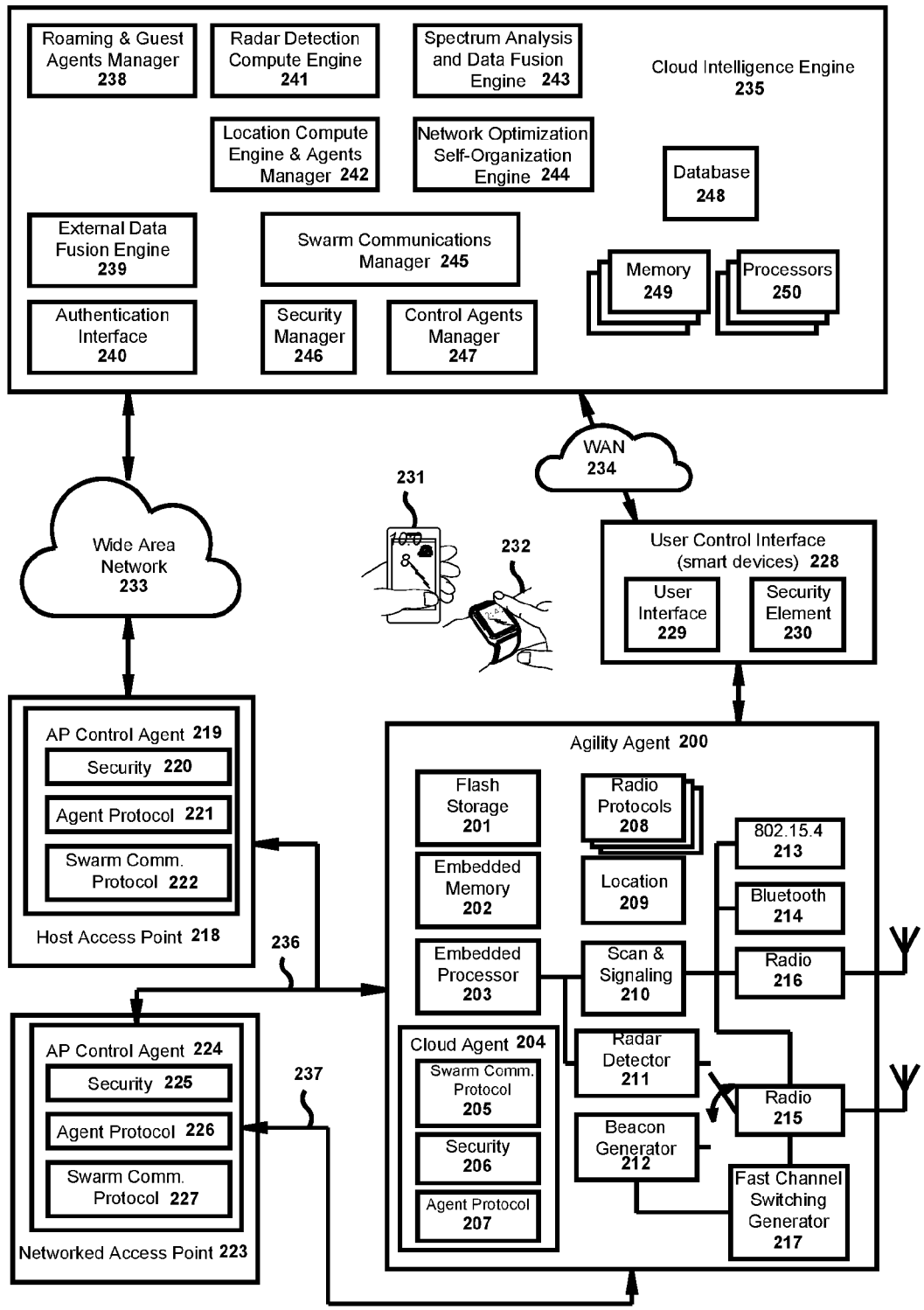
FIG. 2 illustrates how such an exemplary cloud-based intelligence engine may interface with an autonomous DFS master, a conventional host access point, and client devices in accordance with the present invention.

FIG. 2 provides a detailed illustration of an exemplary system of the present invention. As illustrated in FIG. 2, the cloud intelligence engine 235 may be connected to a plurality of agility agents 200 and user devices 231, 232. It is to be appreciated that the cloud intelligence engine can be a set of cloud intelligence devices associated with cloud-based distributed computational resources. For example, the cloud intelligence engine can be associated with multiple devices, multiple servers, multiple machines and/or multiple clusters. The cloud intelligence engine 235 includes a database 248 and memory 249 for storing information from the agility agent 200, one or more other agility agents (e.g., the agility agent(s) 251) connected to the cloud intelligence engine 235 and/or one or more external data source (e.g., data source(s) 252). The database 248 and memory 249 allow the cloud intelligence engine 235 to store information associated with the agility agent 200, the agility agent(s) 251 and/or the data source(s) 252 over a certain period of time (e.g., days, weeks, months, years, etc.). The data source(s) 252 may be associated with a set of databases. Furthermore, the data source(s) 252 may include regulation information such as, but not limited to, GIS information, other geographical information, FCC information regarding the location of radar transmitters, FCC blacklist information, NOAA databases, DOD information regarding radar transmitters, DOD requests to avoid transmission in DFS channels for a given location, and/or other regulatory information.

The cloud intelligence engine 235 also includes processors 250 to perform the cloud intelligence operations described herein. In an aspect, the processors 250 may be communicatively coupled to the memory 249. Coupling can include various communications including, but not limited to, direct communications, indirect communications, wired communications, and/or wireless communications. In certain implementations, the processors 250 may be operable to execute or facilitate execution of one or more of computer-executable components stored in the memory 249. For example, the processors 250 may be directly involved in the execution of the computer-executable component(s), according to an aspect. Additionally or alternatively, the processors 250 may be indirectly involved in the execution of the computer executable component(s). For example, the processors 250 may direct one or more components to perform the operations.

The cloud intelligence engine 235 also knows the location of each agility agent (e.g., the agility agent 200 and/or the agility agent(s) 251) and the access points proximate to the agility agents that do not have a controlling agent as well as the channel on which each of those devices is operating. With this information, the spectrum analysis and data fusion engine 243 and the network optimization self-organization engine 244 can optimize the local spectrum by telling agility agents (e.g., the agility agent 200 and/or the agility agent(s) 251) to avoid channels subject to interference. The swarm communications manager 245 manages communications between agility agents, access points, client devices, and other devices in the network. The cloud intelligence engine includes a security manager 246. The control agents manager 247 manages all connected control agents. In an implementation, the cloud intelligence engine 235 may enable the host access point 218 to coordinate network configurations with same networks (e.g., WiFi to WiFi) and/or across different networks (e.g., WiFi to LTE-U). Furthermore, the cloud intelligence engine 235 may enable agility agents (e.g., agility agent 200 and agility agent(s) 251) connected to different host access devices to communicate within a same network (e.g., WiFi to WiFi) and/or across a different network (e.g., WiFi to LTE-U).

Independent of a host access point 218, the agility agent 200, in the role of an autonomous DFS master device, may also provide the channel indication and channel selection control to one or more peer-to-peer client devices 231, 232 within the coverage area by (a) signaling availability of one or more DFS channels by simultaneous transmission of one or more beacon signals; (b) transmitting a listing of both the authorized available DFS channels, herein referred to as a whitelist and the prohibited DFS channels in which a potential radar signal has been detected, herein referred to as a blacklist along with control signals and a time-stamp signal, herein referred to as a dead-man switch timer via an associated non-DFS channel; and (c) receiving control, coordination and authorized and preferred channel selection guidance information from the cloud intelligence engine 235.

The capability and functions in (a) to (c) are enabled by the centralized cloud intelligence engine which collects and combines the DFS radar and other spectrum information from each agility agent and geo-tags, stores, filters, and integrates the data over time, and combines it together by data fusion technique with information from a plurality of other agility agents distributed in space, and performs filtering and other post-processing on the collection with proprietary algorithms, and merges with other data from vetted sources (such as GIS—Geographical Information System, FAA, FCC, and DoD databases, etc.).

Specifically, the cloud intelligence engine performs the following; (a) continuously collects the spectrum, location and network congestion/traffic information from all wireless agility agents, the number and density of which grows rapidly as more access points and small cell base stations are deployed; (b) continuously applying sophisticated filtering, spatial and time correlation and integration operations, and novel array-combining techniques, and pattern recognition, etc. across the data sets; (c) applying inventive network analysis and optimization techniques to compute network organization decisions to collectively optimize dynamic channel selection of access points and small cell base stations across networks; and (d) directing the adaptive control of dynamic channel selection and radio configuration of 802.11ac/n access points and/or LTE-U small cell base stations via said wireless agility agents.

Further, an agility agent 200, in the role of an autonomous DFS master device, may control at least one access point or LTE-U small cell base station to dictate selection of a channel (e.g., a communication channel associated with the 5 GHz Wi-Fi spectrum 101) for the access point. The channels may include other DFS channels such as a plurality of 5.9 GHz communication channels, a plurality of 3.5 GHz communication channels, etc., but for simplicity, the examples below use 5 GHz channels. For example, the agility agent 200 may control a host access point 218 to dictate selection of a channel for the host access point 218. In one example, the agility agent 200 may be an agility agent device. In another example, the agility agent 200 may be a DFS device (e.g., an autonomous DFS master device). The agility agent 200 may dictate selection of a channel for the access point or the LTE-U small cell base station (e.g., the host access point 218) based on information provided to and/or received from a cloud intelligence engine 235. For example, the agility agent 200 may be an agility agent device in communication with the host access point device 218. Furthermore, the agility agent 200 may generate spectral information associated with a plurality of 5 GHz communication channels for the host access point device 218. The cloud intelligence engine 235 may be a device (e.g. a cloud intelligence device) that receives the spectral information via a wide area network 233 (e.g. via a network device associated with the wide area network 233). Furthermore, the cloud intelligence engine 235 may integrate the spectral information with other spectral information associated with other host access point devices (e.g., other access point devices 223) to generate integrated spectral information. The integrated spectral information may also be location-tagged and/or time-stamped. Then, the cloud intelligence engine 235 may determine a communication channel, or a communication channel preference list (e.g., communication channels from the plurality of communication channels associated with the DFS Wi-Fi spectrum 101 free of radar) for the host access point device 218 and based at least on the integrated spectral information. The communication channel preference list is a cloud computed channel preference list based on radar signal and spectral information. The preference list may be used by the DFS master to focus its radar detection and spectral scan as well as used by the network device to perform channel fallback when it loses its primary communication channel.

The agility agent 200 may dictate channel selection by (a) signaling availability of one or more DFS channels by simultaneous transmission of one or more beacon signals; (b) transmitting a listing of both the authorized available DFS channels, herein referred to as a whitelist, and the prohibited DFS channels in which a potential radar signal has been detected, herein referred to as a blacklist, along with control signals and a time-stamp signal, herein referred to as a dead-man switch timer via an associated non-DFS channel; (c) transmitting the same signals as (b) over a wired medium such as Ethernet or serial cable; and (d) receiving control, coordination and authorized and preferred channel selection guidance information from the cloud intelligence engine 235. The agility agent 200 sends the time-stamp signal, or dead-man switch timer, with communications to ensure that the access points 218, 223 do not use the information, including the whitelist, beyond the useful lifetime of the information. For example, a whitelist will only be valid for certain period of time. The time-stamp signal avoids using noncompliant DFS channels by ensuring that an access point will not use the whitelist beyond its useful lifetime. This allows currently available 5 GHz access points without radar detection—which cannot operate in the DFS channels—to operate in the DFS channels by providing the radar detection required by the FCC or other regulatory agencies. In an embodiment, the agility agent 200 may send a status signal (e.g., a heartbeat signal) to the AP control agent 219 to indicate a current status and/or a current state of the agility agent 200. The status signal provided by the agility agent 200 may act as a dead-man switch (e.g., in response to a local failure). Therefore, the AP control agent 219 can safely operate on non-DFS channels. In certain implementations, authorized available DFS channels can be associated with a set of enforcement actions that are time limited (e.g., authorized DFS channels for a certain geographic region can become unavailable for a few hours, etc.).

The host access point 218 and any other access point devices 223 under control of the agility agent 200 typically have an access point control agent portion 219, 224 installed within their respective communication stacks. For example, the host access point 218 may have an access point control agent portion 219, 224 installed within a communication stack of the host access point 218. Furthermore, the network access point 223 may also have an access point control agent portion 219, 224 installed within a communication stack of the network access point 223. The access point control agent 219, 224 is an agent that acts under the direction of the agility agent 200 to receive information and commands from the agility agent 200. The access point control agent 219, 224 acts on information from the agility agent 200. For example, the access point control agent 219, 224 listens for information like a whitelist or blacklist from the agility agent. If a radar signal is detected by the agility agent 200, the agility agent 200 communicates that to the access point control agent 219, 224, and the access point control agent 219, 224 acts to evacuate the channel within a certain time interval (e.g., immediately). The control agent can also take commands from the agility agent 200. For example, the host access point 218 and network access point 223 can offload DFS monitoring to the agility agent 200 as long as they can listen to the agility agent 200 and take commands from the agility agent regarding available DFS channels.

The host access point 218 is connected to the wide area network 233 and includes the access point control agent 219 to facilitate communications with the agility agent 200. The access point control agent 219 includes a security module 220 and agent protocols 221 to facilitate communication with the agility agent 200, and swarm communication protocols 222 to facilitate communications between agility agents, access points, client devices and/or other devices in the network. The agility agent 200 connects to the cloud intelligence engine 235 via the host access point 218 and the wide area network 233. The host access point 218 may set up a secure communications tunnel to communicate with the cloud intelligence engine 235 through, for example, an encrypted control channel associated with the host access point 218 and/or an encrypted control API in the host access point 218. The agility agent 200 may transmit (e.g., though the secure communications tunnel) the spectral information to the cloud intelligence engine 235. The spectral information may include information such as, for example, a whitelist (e.g., a whitelist of each of the plurality of 5 GHz communication channels associated with the 5 GHz Wi-Fi spectrum 101 that does not contain a radar signal), a blacklist (e.g., a blacklist of each of the plurality of 5 GHz communication channels associated with the 5 GHz Wi-Fi spectrum 101 that contains a radar signal), scan information associated with a scan for a radar signal in the plurality of 5 GHz communication channels associated with the 5 GHz Wi-Fi spectrum 101, state information, location information associated with the agility agent device and/or the access point device, time signals, scan lists (e.g., scan lists showing neighboring access points, etc.), congestion information (e.g., number of re-try packets, type of re-try packets, etc.), traffic information, other channel condition information, and/or other spectral information.

The cloud intelligence engine 235 may combine the spectral information with other spectral information (e.g., other spectral information associated with agility agent(s) 251) to generate combined spectral information. Then, the cloud intelligence engine 235 may determine a particular communication channel (e.g., a particular communication channel associated with the 5 GHz Wi-Fi spectrum 101) and may communicate the particular communication channel to the agility agent 200 (e.g., via the secure communications tunnel). Additionally or alternatively, the cloud intelligence engine 235 may communicate other information to the agility agent 200 (e.g., via the secure communications tunnel) such as, for example, access point location (including neighboring access points), access point/cluster current state and history, statistics (including traffic, congestion, and throughput), whitelists, blacklists, authentication information, associated client information, regional information, regulatory information and/or other information. The agility agent 200 uses the information from the cloud intelligence engine 235 to control the host access point 218, other access points and/or other network devices.

The agility agent 200 may communicate via wired connections or wirelessly with the other network components. In the illustrated example, the agility agent 200 includes a primary radio 215 and a secondary radio 216. The primary radio 215 is for DFS and radar detection. The primary radio 215 is typically a 5 GHz radio. In one example, the primary radio 215 can be a 5 GHz transceiver. The agility agent 200 may receive radar signals, traffic information, and/or congestion information through the primary radio 215. And the agility agent 200 may transmit information, such as DFS beacons, via the primary radio 215. The secondary radio 216 is a secondary radio for sending control signals to other devices in the network. The secondary radio 216 is typically a 2.4 GHz radio. The agility agent 200 may receive information such as network traffic, congestion, and/or control signals with the secondary radio 216. And the agility agent 200 may transmit information, such as control signals, with the secondary radio 216. The primary radio 215 is connected to a fast channel switching generator 217 that includes a switch and allows the primary radio 215 to switch rapidly between a radar detector 211 and beacon generator 212. The fast channel switching generator 217 allows the radar detector 211 to switch sufficiently fast to appear to be on multiple channels at a time. In certain implementations, the agility agent 200 may also include coordination 253. The coordination 253 may provide cross-network coordination between the agility agent 200 and another agility agent (e.g., agility agent(s) 251). For example, the coordination 253 may provide coordination information (e.g., precision location, precision position, channel allocation, a time-slice duty cycle request, traffic loading, etc.) between the agility agent 200 and another agility agent (e.g., agility agent(s) 251) on a different network. In one example, the coordination 253 may enable an agility agent (e.g., agility agent 200) attached to a Wi-Fi router to coordinate with a nearby agility (e.g., agility agent(s) 251) attached to a LTE-U small cell base station.

The standalone multi-channel DFS master may include a beacon generator 212 to generate a beacon in each of a plurality of 5 GHz radio channels (e.g., a plurality of 5 GHz radio channels associated with the 5 GHz Wi-Fi spectrum 101), a radar detector 211 to scan for a radar signal in each of the plurality of 5 GHz radio channels, a 5 GHz radio transceiver (e.g., the primary radio 215) to transmit the beacon in each of the plurality of 5 GHz radio channels and to receive the radar signal in each of the plurality of 5 GHz radio channels, and a fast channel switching generator 217 coupled to the radar detector, the beacon generator, and the 5 GHz radio transceiver. The fast channel switching generator 217 switches the 5 GHz radio to a first channel of the plurality of 5 GHz radio channels and then causes the beacon generator 212 to generate the beacon in the first channel of the plurality of 5 GHz radio channels. Then, the fast channel switching generator 217 causes the radar detector 211 to scan for the radar signal in the first channel of the plurality of 5 GHz radio channels. The fast channel switching generator 217 then repeats these steps for each other channel of the plurality of 5 GHz radio channels during a beacon transmission duty cycle and, in some examples, during a radar detection duty cycle. The beacon transmission duty cycle is the time between successive beacon transmissions on a given channel and the radar detection duty cycle which is the time between successive scans on a given channel. Because the agility agent 200 cycles between beaconing and scanning in each of the plurality of 5 GHz radio channels in the time window between a first beaconing and scanning in a given channel and a subsequent beaconing and scanning the same channel, it can provide effectively simultaneous beaconing and scanning for multiple channels.

The agility agent 200 also may contain a Bluetooth radio 214 and/or an 802.15.4 radio 213 for communicating with other devices in the network. The agility agent 200 may include various radio protocols 208 to facilitate communication via the included radio devices.

The agility agent 200 may also include a location module 209 to geolocate or otherwise determine the location of the agility agent 200. Information provided by the location module 209 may be employed to location-tag and/or time-stamp spectral information collected and/or generated by the agility agent 200. As shown in FIG. 2, the agility agent 200 may include a scan and signaling module 210. The agility agent 200 includes embedded memory 202, including for example flash storage 201, and an embedded processor 203. The cloud agent 204 in the agility agent 200 facilitates aggregation of information from the cloud agent 204 through the cloud and includes swarm communication protocols 205 to facilitate communications between agility agents, access points, client devices, and other devices in the network. The cloud agent 204 also includes a security module 206 to protect and secure the cloud communications of the agility agent 200, as well as agent protocols 207 to facilitate communication with the access point control agents 219, 224.

As shown in FIG. 2, the agility agent 200 may control other access points, for example networked access point 223, in addition to the host access point 218. The agility agent 200 may communicate with the other access points 223 via a wired or wireless connection 236, 237. In one example, the agility agent 200 may communicate with the other access points 223 via a local area network. The other access points 223 include an access point control agent 224 to facilitate communication with the agility agent 200 and other access points. The access point control agent 224 includes a security module 225, agent protocols 226 and swarm communication protocols 227 to facilitate communications with other agents (including other access points and client devices) on the network.

The roaming and guest agents manager 238 in the cloud intelligence engine 235 provides optimized connection information for devices connected to agility agents that are roaming from one access point to another access point (or from one access point to another network). The roaming and guest agents manager 238 also manages guest connections to networks for agility agents connected to the cloud intelligence engine 235. The external data fusion engine 239 provides for integration and fusion of information from agility agents with information from the data source(s) 252. For example, the external data fusion engine 239 may integrate and/or fuse information such as, but not limited to, GIS information, other geographical information, FCC information regarding the location of radar transmitters, FCC blacklist information, NOAA databases, DOD information regarding radar transmitters, DOD requests to avoid transmission in DFS channels for a given location, and/or other information. The cloud intelligence engine 235 further includes an authentication interface 240 for authentication of received communications and for authenticating devices and users. The radar detection compute engine 241 aggregates radar information from the agility agent 200, the agility agent(s) 251 and/or the data source(s) 252. The radar detection compute engine 241 also computes the location of radar transmitters from those data to, among other things, facilitate identification of false positive radar detections or hidden nodes and hidden radar. The radar detection compute engine 241 may also guide or steer multiple agility agents to dynamically adapt detection parameters and/or methods to further improve detection sensitivity. The location compute and agents manager 242 determines the location of the agility agent 200 and other connected devices (e.g., agility agent(s) 251) through Wi-Fi lookup in a Wi-Fi location database, querying passing devices, triangulation based on received signal strength indication (RSSI), triangulation based on packet time-of-flight, scan lists from agility agents, and/or geometric inference.

The spectrum analysis and data fusion engine 243 and the network optimization self-organization engine 244 facilitate dynamic spectrum optimization with information from the agility agent 200, the agility agent(s) 251 and/or the data source(s) 252. Each of the agility agents (e.g., the agility agent 200 and/or the agility agent(s) 251) connected to the cloud intelligence engine 235 have scanned and analyzed the local spectrum and communicated that information to the cloud intelligence engine 235.

The agility agent 200 sends the time-stamp signal, or dead-man switch timer, with communications to ensure that the devices do not use the information (for example, certain enforcement actions like blacking out a region for a few hours) beyond the useful lifetime of the information. The time-stamp signal avoids using noncompliant DFS channels by ensuring that a device will not use the whitelist beyond its useful lifetime. Additionally, the agility agent can send a heartbeat to access point control agents to indicate the health and status of the agility agent. This also may act as a dead man switch in the event of a local failure, and thereby the control agents can safely operate on non-DFS channels. The concept of a whitelist that has a time limit is not practical. The FCC would never accept it as detection of radar is a continual monitoring task.

Such peer-to-peer devices may have a user control interface 228. The user control interface 228 includes a user interface 229 to allow the client devices 231, 232 to interact with the agility agent 200 via the cloud intelligence engine 235. For example, the user interface 229 allows the user to modify network settings via the agility agent 200 including granting and revoking network access. The user control interface 228 also includes a security element 230 to ensure that communications between the client devices 231, 232 and the agility agent 200 are secure. The client devices 231, 232 are connected to a wide area network 234 via a cellular network for example. In certain embodiments, peer-to-peer wireless networks are used for direct communication between devices without a dedicated access point (in Wifi-Direct networks, one client device is the group owner and operates as an access point, but is not a dedicated access point). For example, video cameras may connect directly to a computer to download video or images files using a peer-to-peer network. Also, device connections to external monitors and device connections to drones currently use peer-to-peer networks. Therefore, in a peer-to-peer network without an access point, DFS channels cannot be employed since there is no access point to control DFS channel selection and/or to tell the devices which DFS channels to use.

Figure 3:
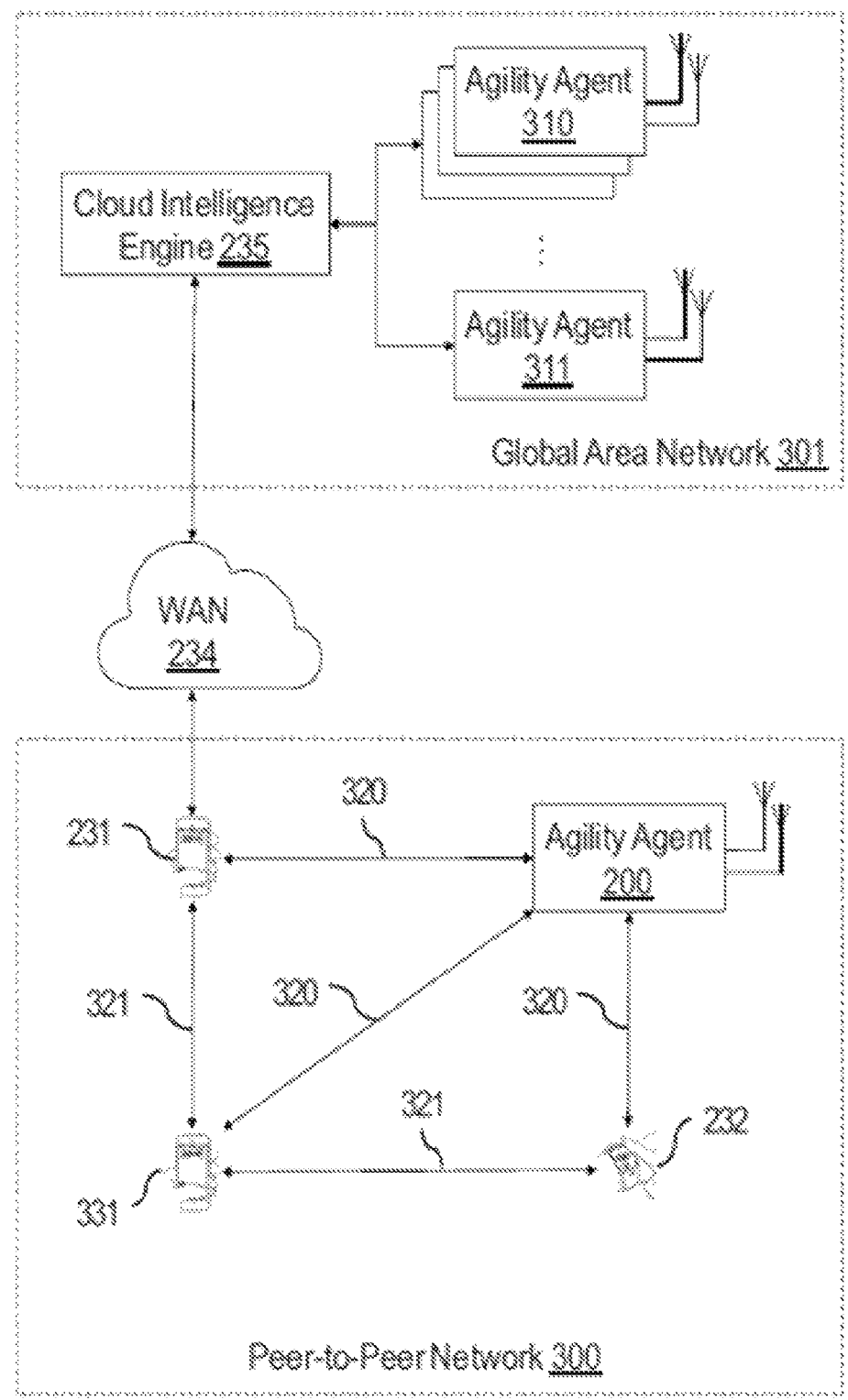
FIG. 3 illustrates how an exemplary cloud-based intelligence engine may interface in a peer-to-peer network may interface with client devices and the autonomous DFS master independent of any access point, in accordance with the present invention.

FIG. 3 illustrates how the cloud intelligence engine 235 in a peer-to-peer network 300 (a local area network for example) would interface to client devices 231, 232, 331 and the agility agent 200 acting as an autonomous DFS master independent of any access point. As shown in FIG. 3, the cloud intelligence engine 235 may be connected to a plurality of network-connected agility agents 200, 310. The agility agent 200 in the peer-to-peer network 300 may connect to the cloud intelligence engine 235 through one of the network-connected client devices 231, 331 by, for example, piggy-backing a message to the cloud intelligence engine 235 on a message send to the client devices 231, 331 or otherwise co-opting a connection of the client devices 231, 331 to the wide area network 234. In the peer-to-peer network 300, the agility agent 200 sends over-the-air control signals 320 to the client devices 231, 232, 331 including indications of channels free of occupying signals such as DFS channels free of radar signals. Alternatively, the agility agent communicates with just one client device 331 (e.g., a single client device 331) which then acts as the group owner to initiate and control the peer-to-peer communications with other client devices 231, 232. The client devices 231, 232, 331 have peer-to-peer links 321 through which they communicate with each other. The agility agent 200 may operate in multiple modes executing a number of DFS scan methods employing different algorithms.

Figure 4:
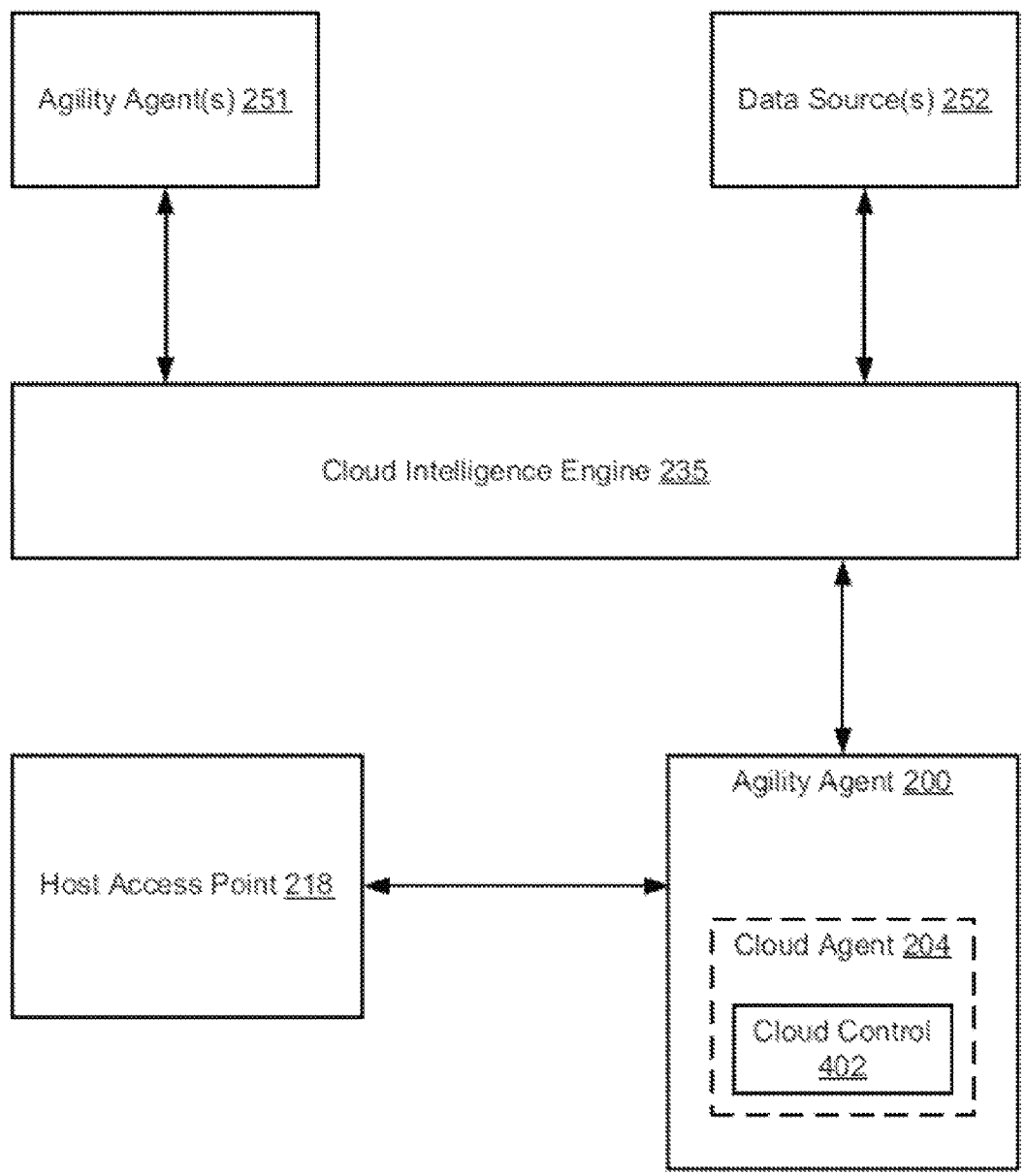
FIG. 4 illustrates a system that includes a cloud intelligence engine, agility agent(s), a host access point and data source(s), in accordance with the present invention.

FIG. 4 illustrates a system that includes the cloud intelligence engine 235, the agility agent 200 and the host access point 218. The agility agent 200 may be directed by the cloud intelligence engine 235 (e.g., a cloud-based data fusion and computation element) to enable adaptive control of dynamic channel selection for the host access point 218 and/or other functions (e.g., dynamic configuration of radio parameters, etc.) associated with the host access point 218. As disclosed herein, in an aspect, the agility agent 200 includes the cloud agent 204. For example, the cloud agent 204 may enable the agility agent 200 to communicate with the host access point 218. The cloud agent 204 may additionally or alternatively communicate with one or more other devices (not shown) such as, for example, a base station (e.g., a small cell base station), a DFS slave device, a peer-to-peer group owner device, a mobile hotspot device, a radio access node device (e.g., an LTE-small cell device), a software access point device and/or another device. In an implementation, the cloud agent 204 includes cloud control 402. The cloud control 402 may further enable the agility agent 200 to communicate with the cloud intelligence engine 235. Furthermore, the cloud control 402 may facilitate dynamic selection of radio channels and/or other radio frequency parameters for the host access point 218. For example, the agility agent 200 may analyze a plurality of 5 GHz radio channels (e.g., a plurality of 5 GHz radio channels associated with the 5 GHz Wi-Fi spectrum 101) for the host access point 218. Additionally or alternatively, the agility agent 200 may analyze a plurality of 5 GHz radio channels (e.g., a plurality of 5 GHz radio channels associated with the 5 GHz Wi-Fi spectrum 101) for the DFS slave device, the peer-to-peer group owner device, the mobile hotspot device, the radio access node device (e.g., the LTE-small cell device), the software access point device and/or another device. In an aspect, the agility agent 200 may actively scan the plurality of 5 GHz radio channels (e.g., the plurality of 5 GHz radio channels associated with the 5 GHz Wi-Fi spectrum 101) during a CAC phase and/or during an ISM phase.

Then, the agility agent 200 may generate spectral information based on the analysis of the plurality of 5 GHz radio channels (e.g., the plurality of 5 GHz radio channels for the host access point 218, the DFS slave device, the peer-to-peer group owner device, the mobile hotspot device, the radio access node device, the software access point device and/or another device). For example, the agility agent 200 may provide information (e.g., spectral information) to the cloud intelligence engine 235 that indicates a set of channels from the plurality of 5 GHz radio channels which are clear of radar and are thus available to use by nearby devices (e.g., the host access point 218). The spectral information may include information such as, for example, a whitelist (e.g., a whitelist of each of the plurality of 5 GHz radio channels that does not contain a radar signal), a blacklist (e.g., a blacklist of each of the plurality of 5 GHz radio channels that contains a radar signal), scan information associated with a scan for a radar signal in the plurality of 5 GHz radio channels, state information, location information associated with the agility agent 200 and/or the host access point 218, time signals, scan lists (e.g., scan lists showing neighboring access points, etc.), congestion information (e.g., number of re-try packets, type of re-try packets, etc.), traffic information, other channel condition information, and/or other spectral information. The cloud control 402 may transmit the spectral information to the cloud intelligence engine 235. In an aspect, the agility agent 200 may transmit the spectral information to the cloud intelligence engine 235 via a wide area network. Additionally or alternatively, the agility agent 200 may transmit the spectral information to the cloud intelligence engine 235 via a set of DFS slave devices in communication with the agility agent 200 (e.g., via a backhaul of DFS slave devices in communication with the agility agent 200). In another aspect, the agility agent 200 may be in communication with the host access point 218 via a local area network (e.g., a wireless local area network). Additionally or alternatively, the agility agent 200 may be in communication with the host access point 218 via a wide area network (e.g., a wireless wide area network), an ad hoc network (e.g., an IBSS network), a peer-to-peer network (e.g., an IBSS peer-to-peer network), a short range wireless network (e.g., a Bluetooth network), another wireless network and/or another wired network.

The cloud intelligence engine 235 may integrate the spectral information with other spectral information (e.g., other spectral information associated with the agility agent (s) 251) to generate integrated spectral information. For example, the cloud intelligence engine 235 may receive the other spectral information from the agility agent(s) 251. The other spectral information may be generated by the agility agents(s) 251 via an analysis of the plurality of 5 GHz radio channels (e.g., an analysis similarly performed by the agility agent 200). In an aspect, the cloud intelligence engine 235 may include a cloud-based data fusion and computation element for intelligent adaptive network organization, optimization, planning, configuration, management and/or coordination based on the spectral information and the other spectral information. The cloud intelligence engine 235 may geo-tag, filter and/or process the integrated spectral information. In an implementation, the cloud intelligence engine 235 may combine the integrated spectral information with regulation information associated with the data source(s) 252. For example, the regulation information (e.g., non-spectral information) associated with the data source(s) 252 may include information such as, but not limited to, geographical information system (GIS) information, other geographical information, FCC information regarding the location of radar transmitters, FCC blacklist information, National Oceanic and Atmospheric Administration (NOAA) databases, Department of Defense (DOD) information regarding radar transmitters, DOD requests to avoid transmission in DFS channels for a given location, and/or other regulatory information. Based on the integrated spectral information and/or the regulation information associated with the data source(s) 252, the cloud intelligence engine 235 may select a radio channel from the plurality of 5 GHz radio channels for the host access point 218 associated with the agility agent 200. Additionally or alternatively, the cloud intelligence engine 235 may select other radio frequency parameters for the host access point 218 based on the integrated spectral information and/or the regulation information associated with the data source(s) 252.

The cloud control 402 may receive control information and/or coordination information (e.g., authorized and/or preferred channel selection guidance) from the cloud intelligence engine 235. For example, the cloud control 402 may receive the radio channel selected by the cloud intelligence engine 235. Additionally or alternatively, the cloud control 402 may receive the other radio frequency parameters selected by the cloud intelligence engine 235. The agility agent 200 (e.g., the cloud agent 204) may communicate the control information and/or the coordination information (e.g., the control information and/or the coordination information received from the cloud intelligence engine 235) to the host access point 218 (and/or any other access points within a certain distance from the agility agent 200), enabling direct control of the host access point 218 by the cloud intelligence engine 235. For example, the agility agent 200 (e.g., the cloud agent 204) may then configure the host access point 218 to receive data via the radio channel selected by the cloud intelligence engine 235 and/or based on the other radio frequency parameters selected by the cloud intelligence engine 235. In an alternate implementation, the control agent 402 may be employed in an access point not directly connected to the agility agent 200, or in a peer-to-peer capable mobile device, to enable faster and/or improved access to DFS channels.

The agility agent 200 may generate the spectral information based on an analysis of the plurality of 5 GHz radio channels associated with the 5 GHz Wi-Fi spectrum 101. For example, the agility agent 200 may switch a 5 GHz transceiver (e.g., the primary radio 215) of the agility agent 200 to a channel of the plurality of 5 GHz radio channels associated with the 5 GHz Wi-Fi spectrum 101, generate a beacon in the channel of the plurality of 5 GHz radio channels associated with the 5 GHz Wi-Fi spectrum 101, and scan for a radar signal in the channel of the plurality of 5 GHz radio channels associated with the 5 GHz Wi-Fi spectrum 101. Additionally, the agility agent 200 may switch a 5 GHz transceiver (e.g., the primary radio 215) of the agility agent 200 to another channel of the plurality of 5 GHz radio channels associated with the 5 GHz Wi-Fi spectrum 101, generate a beacon in the other channel of the plurality of 5 GHz radio channels associated with the 5 GHz Wi-Fi spectrum 101, and scan for a radar signal in the other channel of the plurality of 5 GHz radio channels associated with the 5 GHz Wi-Fi spectrum 101. The agility agent 200 may repeat this process for each channel of the plurality of 5 GHz radio channels associated with the 5 GHz Wi-Fi spectrum 101. The cloud intelligence engine 235 may receive the spectral information via a wide area network. Furthermore, the cloud intelligence engine 235 may integrate the spectral information with other spectral information generated by the agility agents(s) 251 (e.g., to generate integrated spectral information). Then, the cloud intelligence engine 235 may determine a radio channel from the plurality of 5 GHz radio channels based at least on the integrated spectral information. In certain implementations, the cloud intelligence engine 235 may receive the regulation information from the data source(s) 252. Therefore, the cloud intelligence engine 235 may determine a radio channel for the and from the plurality of 5 GHz radio channels based on the integrated spectral information and the regulation information associated with the data source(s) 252.

Figure 5A:
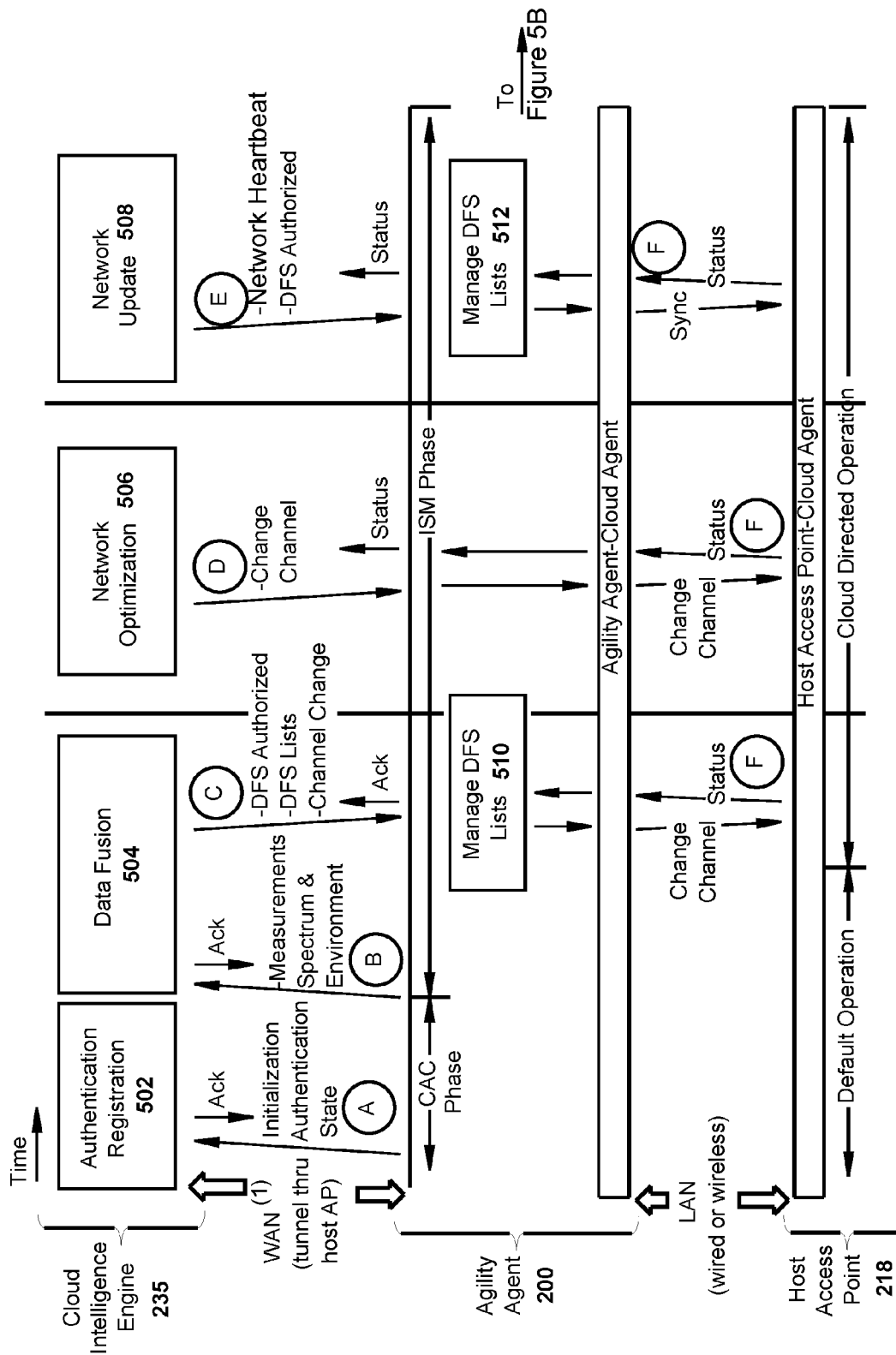
FIG. 5A illustrates exemplary signaling and interfacing between a cloud intelligence engine, an agility agent and a host access point, in accordance with the present invention.

FIG. 5A illustrates an interface between the cloud intelligence engine 235, the agility agent 200 and the host access point 218. For example, signaling and/or messages may be exchanged between the cloud intelligence engine 235 and the agility agent 200. The signaling and/or messages between the cloud intelligence engine 235 and the agility agent 200 may be exchanged during a DFS scan operation, during an ISM operation and/or when a radar event occurs that results in changing of a radio channel. In an aspect, the signaling and/or messages between the cloud intelligence engine 235 and the agility agent 200 may be exchanged via a WAN (e.g., WAN 234) and/or a secure communication tunnel.

An authentication registration process 502 of the cloud intelligence engine 235 may be associated with a message A. The message A may be exchanged between the cloud intelligence engine 235 and the agility agent 200. Furthermore, the message A may be associated with one or more signaling operations and/or one or more messages. The message A may facilitate an initialization and/or authentication of the agility agent 200. For example, the message may include information associated with the agility agent 200 such as, but not limited to, a unit identity, a certification associated with the agility agent 200, a nearest neighbors scan list associated with a set of other agility agents within a certain distance from the agility agent 200, service set identifiers, a received signal strength indicator associated with the agility agent 200 and/or the host access point 218, a maker identification associated with the host access point 218, a measured location (e.g., a global positioning system location) associated with the agility agent 200 and/or the host access point 218, a derived location associated with the agility agent 200 and/or the host access point 218 (e.g., derived via a nearby AP or a nearby client), time information, current channel information, status information and/or other information associated with the agility agent 200 and/or the host access point 218. In one example, the message A can be associated with a channel availability check phase.

A data fusion process 504 of the cloud intelligence engine 235 may facilitate computation of a location associated with the agility agent 200 and/or the host access point 218. Additionally or alternatively, the data fusion process 504 of the cloud intelligence engine 235 may facilitate computation of a set of DFS channel lists. The data fusion process 504 may be associated with a message B and/or a message C. The message B and/or the message C may be exchanged between the cloud intelligence engine 235 and the agility agent 200. Furthermore, the message B and/or the message C may be associated with one or more signaling operations and/or one or more messages. The message B may be associated with spectral measurement and/or environmental measurements associated with the agility agent 200. For example, the message B may include information such as, but not limited to, a scanned DFS white list, a scanned DFS black list, scan measurements, scan statistics, congestion information, traffic count information, time information, status information and/or other measurement information associated with the agility agent 200. The message C may be associated with an authorized DFS, DFS lists and/or channel change. For example, the message C may include information such as, but not limited to, a directed (e.g., approved) DFS white list, a directed (e.g., approved) DFS black list, a current time, a list valid time, a computed location associated with the agility agent 200 and/or the host access point 218, a network heartbeat and/or other information associated with a channel and/or a dynamic frequency selection.

A network optimization process 506 of the cloud intelligence engine 235 may facilitate optimization of a network topology associated with the agility agent 200. The network optimization process 506 may be associated with a message D. The message D may be exchanged between the cloud intelligence engine 235 and the agility agent 200. Furthermore, the message D may be associated with one or more signaling operations and/or one or more messages. The message D may be associated with a change in a radio channel. For example, the message D may be associated with a radio channel for the host access point 218 in communication with the agility agent 200. The message D can include information such as, but not limited to, a radio channel (e.g., a command to switch to a particular radio channel), a valid time of a list, a network heartbeat and/or other information for optimizing a network topology.

A network update process 508 of the cloud intelligence engine 235 may facilitate an update for a network topology associated with the agility agent 200. The network update process 508 may be associated with a message E. The message E may be exchanged between the cloud intelligence engine 235 and the agility agent 200. Furthermore, the message E may be associated with one or more signaling operations and/or one or more messages. The message E may be associated with a network heartbeat and/or a DFS authorization. For example, the message E may include information such as, but not limited to, a nearest neighbors scan list associated with a set of other agility agents within a certain distance from the agility agent 200, service set identifiers, a received signal strength indicator associated with the agility agent 200 and/or the host access point 218, a maker identification associated with the host access point 218, a measured location update (e.g., a global positioning system location update) associated with the agility agent 200 and/or the host access point 218, a derived location update (e.g., derived via a nearby AP or a nearby client) associated with the agility agent 200 and/or the host access point 218, time information, current channel information, status information and/or other information. In one example, the message B, the message C, the message D and/or the message E can be associated with an ISM phase.

A manage DFS lists process 510 of the agility agent 200 may facilitate storage and/or updates of DFS lists. The manage DFS lists process 510 may be associated with a message F. The message F may be exchanged between the agility agent 200 and the host access point 218. In one example, the message F may be exchanged via a local area network (e.g., a wired local area network and/or a wireless local area network). Furthermore, the message F may be associated with one or more signaling operations and/or one or more messages. The message F may facilitate a change in a radio channel for the host access point 218. For example, the message F may include information such as, but not limited to, a nearest neighbors scan list associated with a set of other agility agents within a certain distance from the agility agent 200, service set identifiers, a received signal strength indicator associated with the agility agent 200 and/or the host access point 218, a maker identification associated with the host access point 218, a measured location update (e.g., a global positioning system location update) associated with the agility agent 200 and/or the host access point 218, a derived location update (e.g., derived via a nearby AP or a nearby client) associated with the agility agent 200 and/or the host access point 218, time information, current channel information, status information and/or other information. In one example, the message F may be associated with a cloud directed operation (e.g., a cloud directed operation where DFS channels are enabled).

FIG. 5B also illustrates an interface between the cloud intelligence engine 235, the agility agent 200 and the host access point 218. For example, FIG. 5B may provide further details in connection with FIG. 5A. As shown in FIG. 5B, signaling and/or messages may be exchanged between the cloud intelligence engine 235 and the agility agent 200. The signaling and/or messages between the cloud intelligence engine 235 and the agility agent 200 may be exchanged during a DFS scan operation, during ISM and/or when a radar event occurs that results in changing of a radio channel. In an aspect, the signaling and/or messages between the cloud intelligence engine 235 and the agility agent 200 may be exchanged via a WAN (e.g., WAN 234) and/or a secure communication tunnel.

As also shown in FIG. 5B, the network update process 508 of the cloud intelligence engine 235 may facilitate an update for a network topology associated with the agility agent 200. The network update process 508 may be associated with the message E. Then, a DFS list update process 514 of the cloud intelligence engine 235 may facilitate an update to one or more DFS channel lists. The DFS list update process 514 may be associated with a message G. The message G may be exchanged between the cloud intelligence engine 235 and the agility agent 200. In one example, the message G may be exchanged via a WAN (e.g., WAN 234) and/or a secure communication tunnel. Furthermore, the message G may be associated with one or more signaling operations and/or one or more messages. The message G may be associated with a radar event. For example, the message G may signal a radar event. Additionally or alternatively, the message G may include information associated with a radar event. For example, the message G may include information such as, but not limited to, a radar measurement channel, a radar measurement pattern, a time associated with a radar event, a status associated with a radar event, other information associated with a radar event, etc. The radar event may associated with one or more channels from a plurality of 5 GHz communication channels (e.g., a plurality of 5 GHz communication channels associated with the 5 GHz Wi-Fi spectrum 101). In one example, the message G can be associated with an ISM phase. The DFS list update process 514 may also be associated with the message C.

Moreover, as also shown in FIG. 5B, the manage DFS lists process 510 may be associated with the message F. The message F may be exchanged between the agility agent 200 and the host access point 218. A radar detection process 516 of the agility agent 200 may detect and/or generate the radar event. Additionally, the radar detection process 516 may notify the host access point 218 to change a radio channel (e.g., switch to an alternate radio channel). The message F and/or a manage DFS lists process 512 may be updated accordingly in response to the change in the radio channel. In an aspect, signaling and/or messages may be exchanged between the cloud intelligence engine 235 and the host access point 218 during a DFS scan operation, during an ISM operation and/or when a radar event occurs that results in changing of a radio channel for the host access point 218.

Figure 6A:
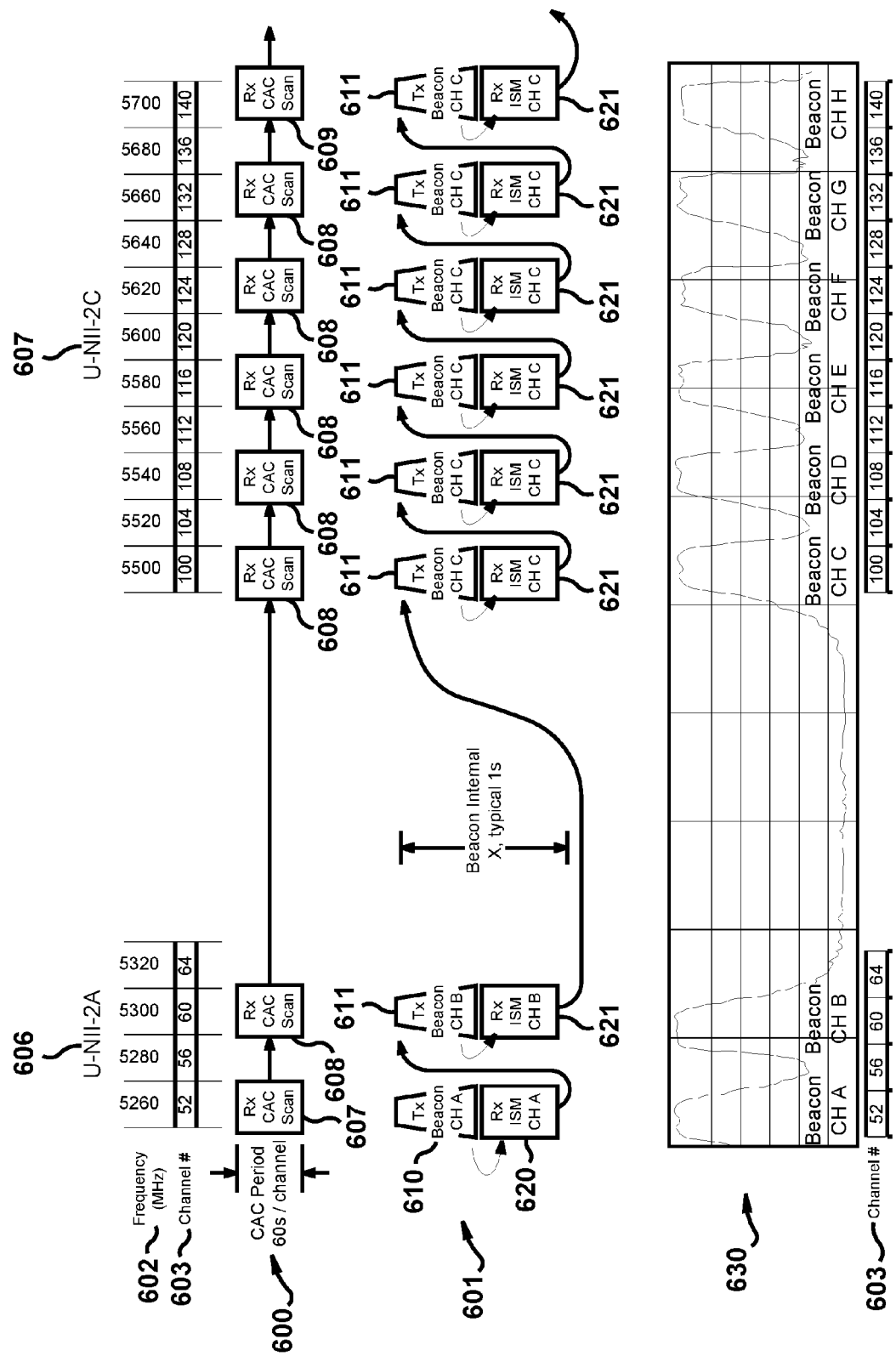
FIG. 6A illustrates a cloud intelligence engine directed method of performing a channel availability check phase and in-service monitoring phase in a DFS scanning operation with an autonomous DFS master to make multiple DFS channels of the 5 GHz band simultaneously available for use.

FIG. 6A shows the frequencies 602 and channels 603 that make up portions of the DFS 5 GHz Wi-Fi spectrum. U-NII-2A 606 covers the 5.25-5.35 GHz range. U-NII-2C 607 covers the 5.47-5.725 GHz range. The first channel to undergo CAC scanning is shown at element 607. The subsequent CAC scans of other channels are shown at elements 608. And the final CAC scan before the ISM phase 601 is shown at element 609.

In the ISM phase 601, the DFS master switches to the first channel in the whitelist. In the example in FIG. 6A, each channel 603 for which a CAC scan was performed was free of radar signals during the CAC scan and was added to the whitelist. Then the DFS master transmits 610 a DFS beacon on that channel. Then the DFS master scans 620 the first channel in the whitelist for the dwell time. Then the DFS master transmits 611 a beacon and scans 621 each of the other channels in the whitelist for the dwell time and then repeats starting 610 at the first channel in the whitelist in a round robin fashion for each respective channel. If a radar pattern is detected, the DFS master beacon for the respective channel is stopped, and the channel is marked in the blacklist and removed from the whitelist (and no longer ISM scanned).

FIG. 6A also shows an exemplary waveform 630 of the multiple beacon transmissions from the DFS master to indicate the availability of the multiple DFS channels to nearby host and non-host (ordinary) access points and client devices.

Figure 6B:
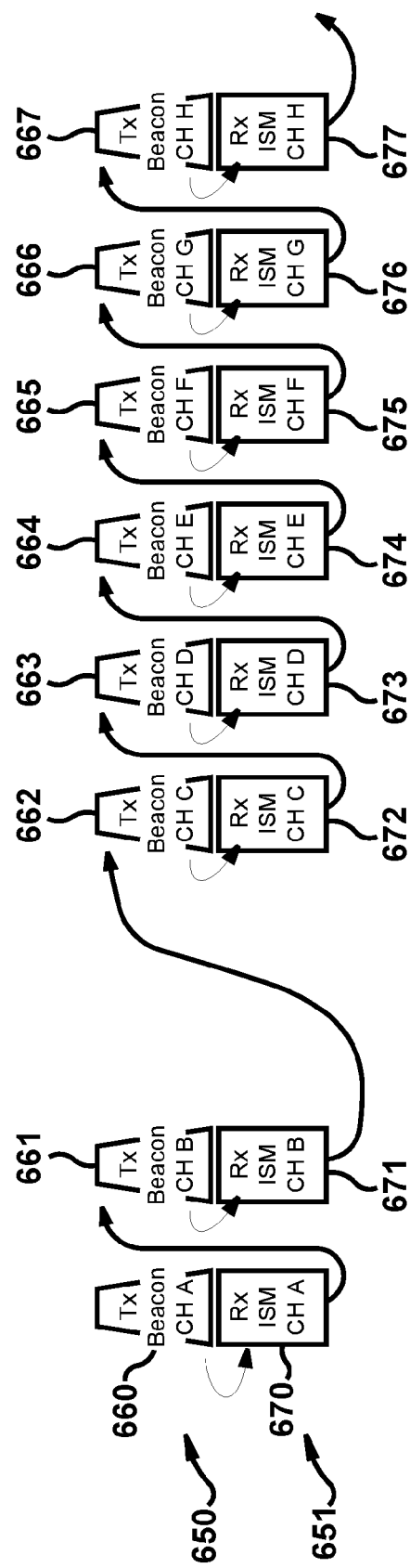
FIG. 6B illustrates an exemplary beacon transmission duty cycle and an exemplary radar detection duty cycle.

FIG. 6B illustrates a beacon transmission duty cycle 650 and a radar detection duty cycle 651. In this example, channel A is the first channel in a channel whitelist. In FIG. 6B, a beacon transmission in channel A 660 is followed by a quick scan of channel A 670. Next a beacon transmission in the second channel, channel B, 661 is followed by a quick scan of channel B 671. This sequence is repeated for channels C 662, 672; D 663, 673; E 664, 674; F 665, 675; G 666, 676, and H 667, 677. After the quick scan of channel H 677, the DFS master switches back to channel A and performs a second beacon transmission in channel A 660 followed by a second quick scan of channel A 670. The time between starting the first beacon transmission in channel A and starting the second beacon transmission in channel A is a beacon transmission duty cycle. The time between starting the first quick scan in channel A and starting the second quick scan in channel A is a radar detection duty cycle. In order to maintain connection with devices on a network, the beacon transmission duty cycle should be less than or equal to the maximum period between the beacons allowable for a client device to remain associated with the network.

The standalone multi-channel DFS master may include a beacon generator 212 to generate a beacon in each of a plurality of 5 GHz radio channels, a radar detector 211 to scan for a radar signal in each of the plurality of 5 GHz radio channels, a 5 GHz radio transceiver (e.g., the primary radio 215) to transmit the beacon in each of the plurality of 5 GHz radio channels and to receive the radar signal in each of the plurality of 5 GHz radio channels, and a fast channel switching generator 217 and embedded processor 203 coupled to the radar detector, the beacon generator 212, and the 5 GHz radio transceiver. The fast channel switching generator 217 and embedded processor 203 switch the 5 GHz radio transceiver (e.g., the primary radio 215) to a first channel of the plurality of 5 GHz radio channels and cause the beacon generator 212 to generate the beacon in the first channel of the plurality of 5 GHz radio channels. The fast channel switching generator 217 and embedded processor 203 also cause the radar detector 211 to scan for the radar signal in the first channel of the plurality of 5 GHz radio channels. The fast channel switching generator 217 and embedded processor 203 then repeat these steps for each of the other channels of the plurality of 5 GHz radio channels. The fast channel switching generator 217 and embedded processor 203 perform all of the steps for all of the plurality of 5 GHz radio channels during a beacon transmission duty cycle which is a time between successive beacon transmissions on a specific channel and, in some cases, a radar detection duty cycle which is a time between successive scans on the specific channel.

Figure 7:
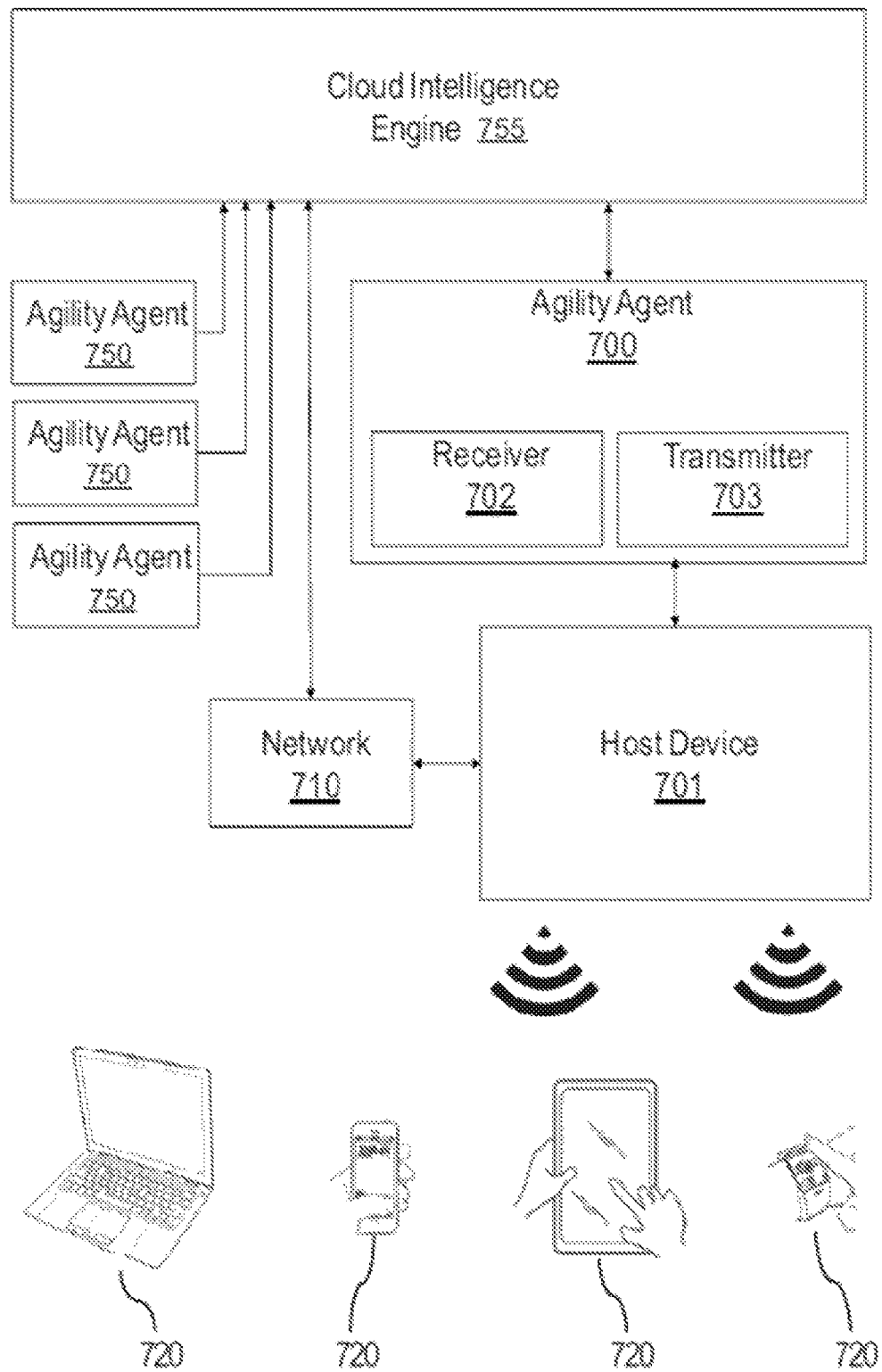
FIG. 7 illustrates an embodiment of the present invention in which the cloud intelligence engine is connected to agility agents, host devices, and a network.

As illustrated in FIG. 7, the present invention may be used for selecting available channels free of occupying signals from a plurality of radio frequency channels. The system includes a cloud intelligence engine 755, at least an agility agent 700, and a host device 701. For example, the agility agent 700 may correspond to the agility agent 200, the host device 701 may correspond to the host access point 218, and/or the cloud intelligence engine 755 may correspond to the cloud intelligence engine 235. In an aspect, the agility agent 700 may function as an autonomous frequency selection master that has both an embedded radio receiver 702 to detect the occupying signals in each of the plurality of radio frequency channels and an embedded radio transmitter 703 to transmit an indication of the available channels and/or an indication of unavailable channels not free of the occupying signals. For example, the embedded radio transmitter 703 can transmit the indication of the available channels and/or the indication of unavailable channels not free of the occupying signals to the cloud intelligence engine 755.

The agility agent 700 is programmed to connect to the host device 701 and control a selection of an operating channel selection of the host device by transmitting the indication of the available channels and the indication of the unavailable channels to the host device 701. The host device 701 communicates wirelessly with client devices 720 and acts as a gateway for client devices to a network 710 such as the Internet, other wide area network, or local area network. The host device 701, under the control of the agility agent 700, tells the client devices 720 which channel or channels to use for wireless communication. Additionally, the agility agent 700 may be programmed to transmit the indication of the available channels and the indication of the unavailable channels directly to client devices 720.

The agility agent 700 may operate in the 5 GHz band and the plurality of radio frequency channels may be in the 5 GHz band and the occupying signals are radar signals. The host device 701 may be a Wi-Fi access point or an LTE-U host device.

Further, the agility agent 700 may be programmed to transmit the indication of the available channels by transmitting a channel whitelist of the available channels to the cloud intelligence engine 235 and/or to transmit the indication of the unavailable channels by transmitting a channel blacklist of the unavailable channels to the cloud intelligence engine 235. In addition to saving the channel in the channel blacklist, the agility agent 700 may also be programmed to determine and save in the channel blacklist information about the detected occupying signals including signal strength, traffic, and type of the occupying signals.

The agility agent 700 is connected to the cloud intelligence engine 855. The agility agent 700 may connect to the cloud intelligence engine 855 directly or through the host device 701 and network 710. The cloud intelligence engine 855 integrates time distributed information from the agility agent 700 and combines information from a plurality of other agility agents 850 distributed in space and connected to the cloud intelligence engine 855. The agility agent 700 is programmed to receive control and coordination signals and authorized and preferred channel selection guidance information from the cloud intelligence engine 755.

Figure 8:
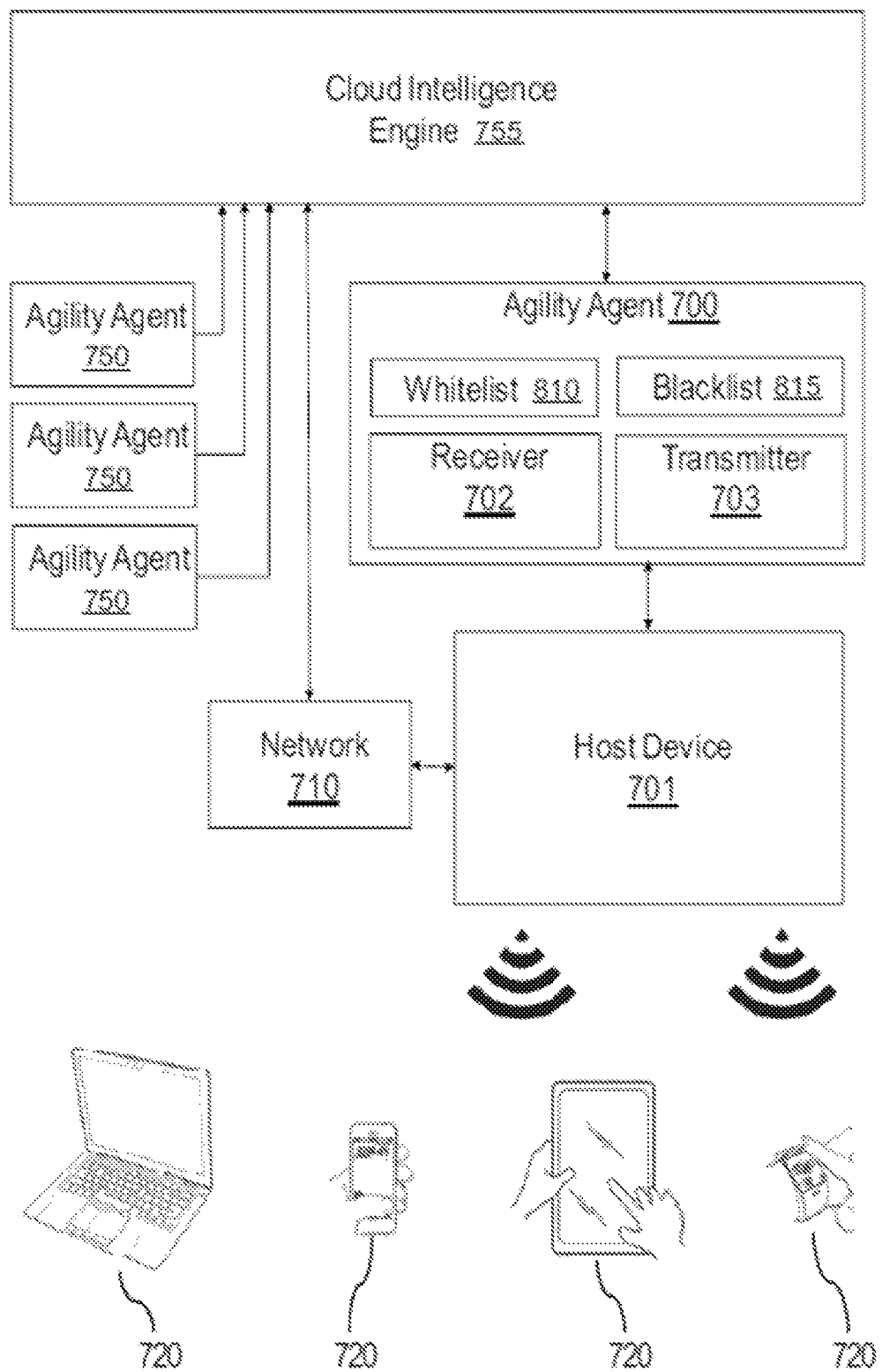
FIG. 8 illustrates another embodiment of the present invention in which the cloud intelligence engine is connected to agility agents, host devices, and a network.

As shown in FIG. 8, the agility agent 700 contains a channel whitelist 810 of one or more channels scanned and determined not to contain an occupying signal. The agility agent 700 may receive the channel whitelist 810 from another device including a cloud intelligence engine 755. Or the agility agent 700 may have previously derived the channel whitelist 810 through a continuous CAC for one or more channels. In this example, the agility agent 700 is programmed to cause the embedded radio receiver 702 to scan each of the plurality of radio frequency channels non-continuously interspersed with periodic switching to the channels in the channel whitelist 810 to perform a quick occupying signal scan in each channel in the channel whitelist 810. The agility agent 700 is further programmed to cause the embedded radio transmitter 703 to transmit a first beacon transmission in each channel in the channel whitelist 810 during the quick occupying signal scan and to track in the channel whitelist 810 the channels scanned and determined not to contain the occupying signal during the non-continuous scan and the quick occupying signal scan. The agility agent 700 is also programmed to track in a channel blacklist 815 the channels scanned and determined to contain the occupying signal during the non-continuous scan and the quick occupying signal scan and then to perform in-service monitoring for the occupying signal, including transmitting a second beacon for each of the channels in the channel whitelist 810, continuously and sequentially. In an aspect, the embedded radio transmitter 703 may transmit the channel whitelist 810 and/or the channel blacklist 815 to the cloud intelligence engine 755.

Figure 9:
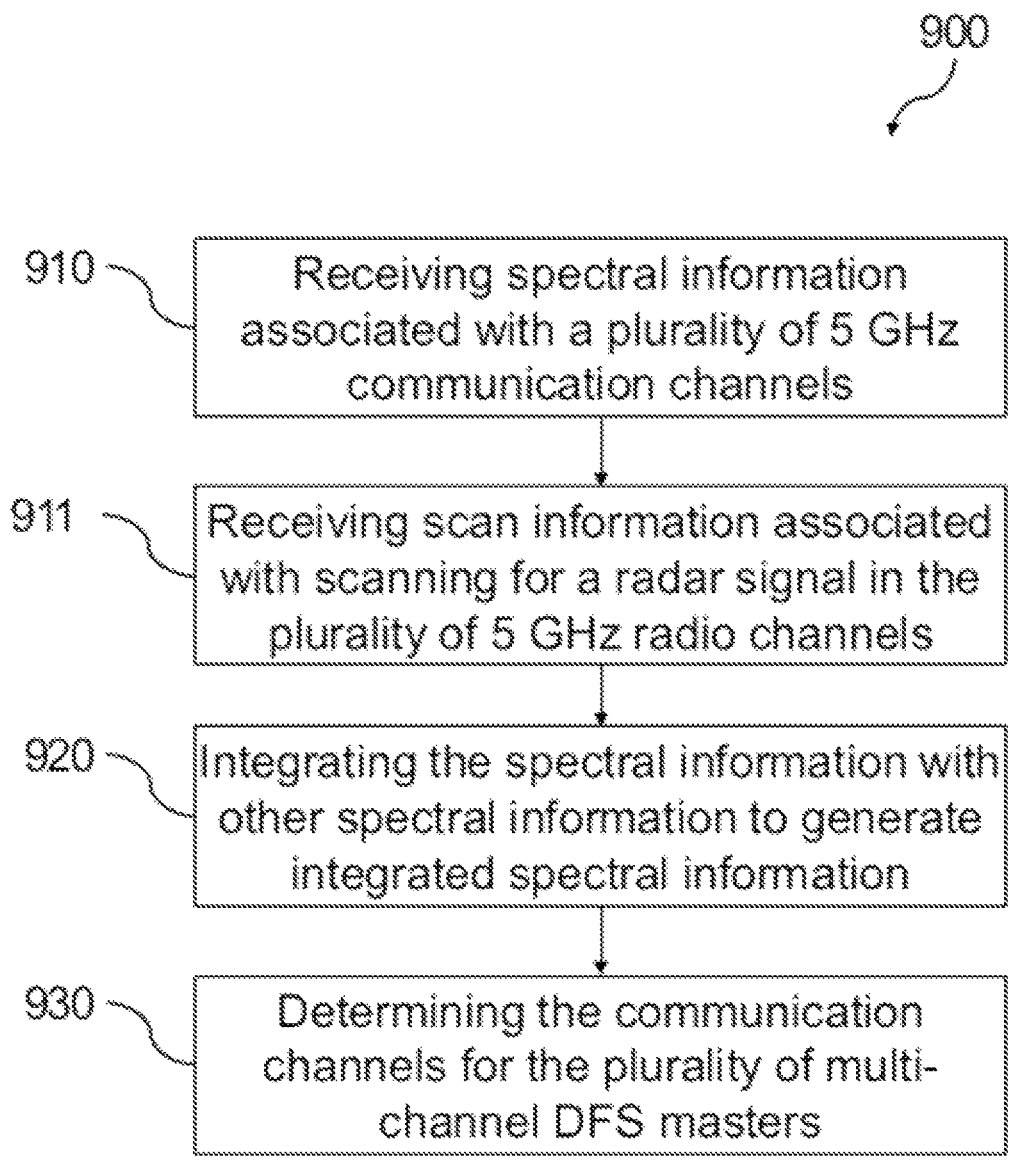
FIG. 9 illustrates a method of determining an operating channel for a plurality of multi-channel DFS masters using a cloud intelligence engine, according to the present invention.
Figure 10:
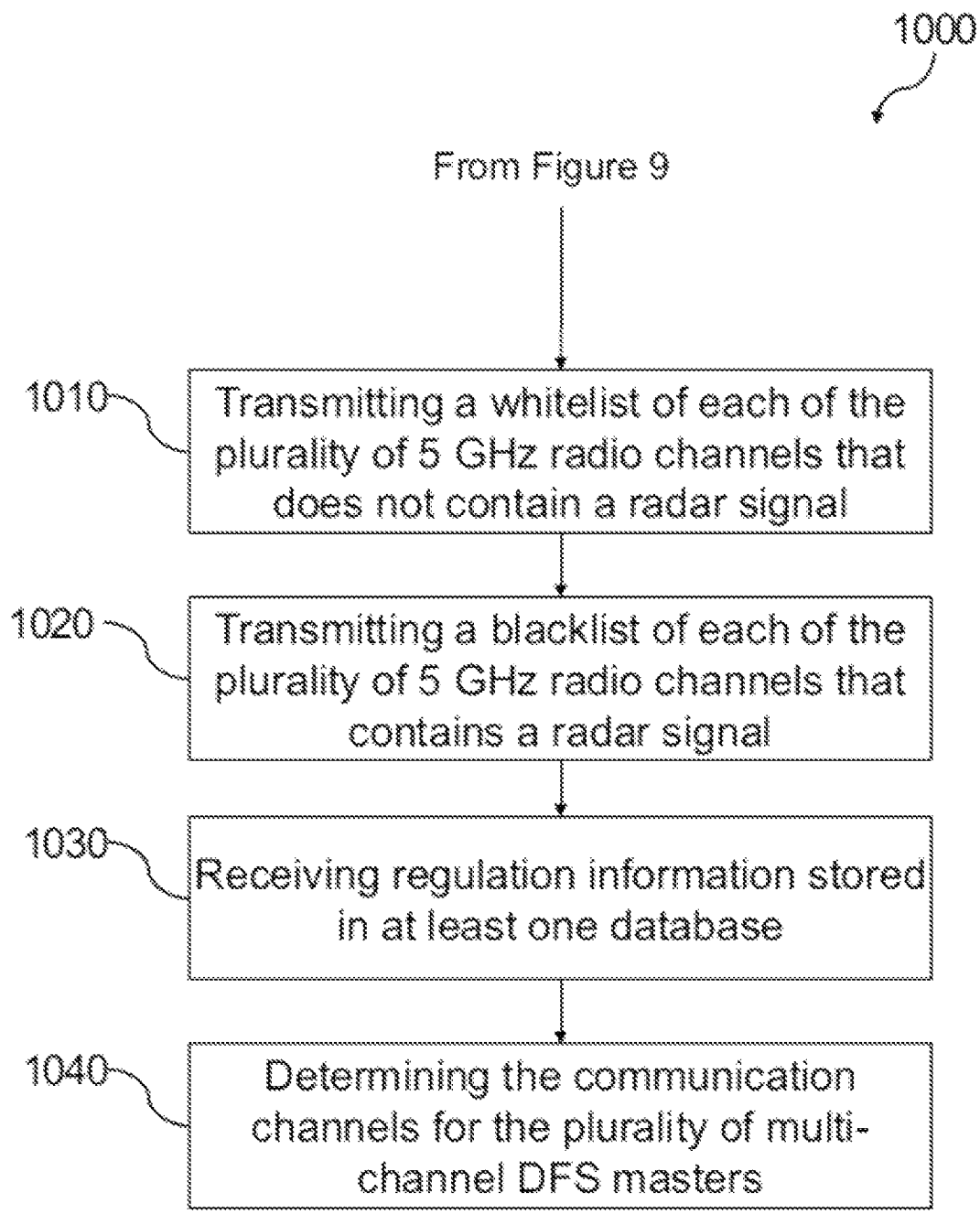
FIG. 10 also illustrates additional methods of determining an operating channel for a plurality of multi-channel DFS masters using a cloud intelligence engine, according to the present invention.

In view of the subject matter described supra, methods that can be implemented in accordance with the subject disclosure will be better appreciated with reference to the flowcharts of FIGS. 9-10. While for purposes of simplicity of explanation, the methods are shown and described as a series of blocks, it is to be understood and appreciated that such illustrations or corresponding descriptions are not limited by the order of the blocks, as some blocks may occur in different orders and/or concurrently with other blocks from what is depicted and described herein. Any non-sequential, or branched, flow illustrated via a flowchart should be understood to indicate that various other branches, flow paths, and orders of the blocks, can be implemented which achieve the same or a similar result. Moreover, not all illustrated blocks may be required to implement the methods described hereinafter.

FIG. 9 illustrates an exemplary method 900 according to the present invention for determining the communication channels that will be used in a plurality of multi-channel DFS masters. First, at 910 the cloud intelligence engine receives spectral information associated with a plurality of 5 GHz communication channels from a plurality of multi-channel DFS masters via one or more network devices. Optionally, at 911 receiving the spectral information includes receiving scan information associated with scanning for a radar signal in the plurality of 5 GHz radio channels. The spectral information may be generated using an agility agent device (e.g., agility agent 200 or agility agent 700) based on an analysis of the plurality of 5 GHz communication channels. Analysis of the plurality of 5 GHz communication channels may include switching a 5 GHz radio transceiver of the agility agent device to a channel of the plurality of 5 GHz communication channels, generating a beacon in the channel of the plurality of 5 GHz communication channels, and scanning for a radar signal in the channel of the plurality of 5 GHz communication channels. The spectral information may include information such as, for example, a whitelist (e.g., a whitelist of each of the plurality of 5 GHz communication channels that does not contain a radar signal), a blacklist (e.g., a blacklist of each of the plurality of 5 GHz communication channels that contains a radar signal), scan information associated with a scan for a radar signal in the plurality of 5 GHz communication channels, state information, location information associated with the agility agent device and/or the access point device, time signals, scan lists (e.g., scan lists showing neighboring access points, etc.), congestion information (e.g., number of re-try packets, type of re-try packets, etc.), traffic information and/or other spectral information. Next, at 920, the cloud intelligence engine integrates the spectral information with other spectral information to generate integrated spectral information. The other spectral information may generated by at least one other agility agent device. In one example, the spectral information may be integrated with the other spectral information via one or more data fusion processes.

Then, at 930, the cloud intelligence engine determines the communication channels for the plurality of multi-channel DFS masters from the plurality of 5 GHz communication channels based at least on the integrated spectral information. For example, a communication channel may be selected from the plurality of 5 GHz communication channels based at least on the integrated spectral information. In an aspect, regulation information associated with the plurality of 5 GHz communication channels and/or stored in at least one database may be received by the cloud intelligence device. Furthermore, the communication channel may be further determined based on the regulation information. In another aspect, an indication of the communication channel may be provided to the agility agent device and/or the access point device.

FIG. 10 illustrates an exemplary method 1000 according to the present invention for determining the communication channels that will be used in a plurality of multi-channel DFS masters. The method illustrated in FIG. 10 includes the steps described in relation to FIG. 9 above but also includes the following optional additional steps. At 1010, the method includes transmitting a whitelist of each of the plurality of 5 GHz radio channels that does not contain a radar signal to the plurality of multi-channel DFS masters via the one or more network devices. At 1020 the method includes transmitting a blacklist of each of the plurality of 5 GHz radio channels that contains a radar signal to the plurality of multi-channel DFS masters via the one or more network devices. At 1030 the method includes receiving regulation information stored in at least one database. The regulation information may include, but is not limited to, GIS information, other geographical information, FCC information regarding the location of radar transmitters, FCC blacklist information, NOAA databases, DOD information regarding radar transmitters, DOD requests to avoid transmission in DFS channels for a given location, and/or other regulatory information. At 1040, the method may include determining the communication channels based on the integrated spectral information and the regulation information.

In the present specification, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should generally be construed to mean "one or more" unless specified otherwise or clear from context to be directed to a singular form.

In addition, the terms "example" and "such as" are utilized herein to mean serving as an instance or illustration. Any embodiment or design described herein as an "example" or referred to in connection with a "such as" clause is not necessarily to be construed as preferred or advantageous over other embodiments or designs. Rather, use of the terms "example" or "such as" is intended to present concepts in a concrete fashion. The terms "first," "second," "third," and so forth, as used in the claims and description, unless otherwise clear by context, is for clarity only and does not necessarily indicate or imply any order in time.

What has been described above includes examples of one or more embodiments of the disclosure. It is, of course, not possible to describe every conceivable combination of components or methodologies for purposes of describing these examples, and it can be recognized that many further combinations and permutations of the present embodiments are possible. Accordingly, the embodiments disclosed and/or claimed herein are intended to embrace all such alterations, modifications and variations that fall within the spirit and scope of the detailed description and the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cloud intelligence engine communicatively coupled to a plurality of multi-channel DFS masters and configured to receive spectral information associated with a plurality of 5 GHz communication channels from the plurality of multi-channel DFS masters via one or more network devices, integrate the spectral information with other spectral information to generate integrated spectral information, and determine a communication channel preference list for the plurality of multi-channel DFS masters from the plurality of 5 GHz communication channels based at least on the integrated spectral information.

2. The cloud intelligence engine of claim 1 further configured to determine the communication channel preference list based on regulation information stored in at least one database.

3. The cloud intelligence engine of claim 1 further configured to determine the communication channel preference list based on non-spectral information that includes regulatory information, geographical information, or oceanic and atmospheric information.

4. The cloud intelligence engine of claim 1, wherein the cloud intelligence engine is configured to receive spatially and temporally diverse sensor data from the plurality of multi-channel DFS masters and to determine the communication channel preference list for the plurality of multi-channel DFS masters from the plurality of 5 GHz communication channels based at least on the spatially and temporally diverse sensor data.

5. The cloud intelligence engine of claim 1, wherein the cloud intelligence engine is configured to apply time integration and/or spatial pattern recognition to discover a hidden node.

6. The cloud intelligence engine of claim 1, wherein the cloud intelligence engine is configured to apply time integration and or spatial pattern recognition to discover a hidden radar.

7. The cloud intelligence engine of claim 1, wherein the cloud intelligence engine is configured to instruct the plurality of multi-channel DFS masters to switch a 5 GHz transceiver of the standalone multi-channel DFS master to a channel in the communication channel preference list, cause a beacon generator of the standalone multi-channel DFS master to generate a beacon in the channel of the plurality of 5 GHz communication channels, and cause a radar detector of the standalone multi-channel DFS master to scan for a radar signal in the channel of the plurality of 5 GHz communication channels.

8. The cloud intelligence engine of claim 1 further configured to transmit a whitelist of each of the plurality of 5 GHz communication channels that does not contain a radar signal to the plurality of multi-channel DFS masters via the one or more network devices.

9. The cloud intelligence engine of claim 1 further configured to transmit a blacklist of each of the plurality of 5 GHz communication channels that contains a radar signal to plurality of multi-channel DFS masters via the one or more network devices.

10. The cloud intelligence engine of claim 1 further configured to receive the spectral information via a wide area network.

11. A method, comprising:
receiving with a cloud intelligence engine spectral information associated with a plurality of 5 GHz communication channels from a plurality of multi-channel DFS masters via one or more network devices;
integrating with the cloud intelligence engine the spectral information with other spectral information to generate integrated spectral information; and
determining communication channels for the plurality of multi-channel DFS masters from the plurality of 5 GHz communication channels based at least on the integrated spectral information.

12. The method of claim 11, wherein the receiving the spectral information comprises receiving scan information associated with scanning for a radar signal in the plurality of 5 GHz radio channels.

13. The method of claim 11, further comprising transmitting a whitelist of each of the plurality of 5 GHz radio channels that does not contain a radar signal to the plurality of multi-channel DFS masters via the one or more network devices.

14. The method of claim 11, further comprising transmitting a blacklist of each of the plurality of 5 GHz radio channels that contains a radar signal to the plurality of multi-channel DFS masters via the one or more network devices.

15. The method of claim 11, further comprising:
receiving, by the cloud intelligence device, regulation information stored in at least one database.

16. The method of claim 15, wherein the determining communication channels comprises determining the communication channels based on the integrated spectral information and the regulation information.

17. A system, comprising:
a cloud intelligence device coupled to a dynamic frequency selection (DFS) device and configured to receive spectral information associated with a plurality of 5 GHz radio channels based on an analysis of the plurality of 5 GHz radio channels from the DFS device via a wide area network;
wherein the cloud intelligence device is configured to integrate the spectral information with other spectral information to generate integrated spectral information and to determine a radio channel for an access point device from the plurality of 5 GHz radio channels based at least on the integrated spectral information;
wherein the access point device is in communication with the DFS device via a local area network, and wherein the other spectral information is generated by at least one other DFS device configured to analyze the plurality of 5 GHz radio channels.

18. The system of claim 17, wherein the cloud intelligence device is further configured to determine the radio channel based on non-spectral information that includes regulatory information, geographical information, or oceanic and atmospheric information.

19. The system of claim 17, wherein the cloud intelligence device is configured to receive from the DFS device the spectral information comprising scan information associated with the scan for the radar signal in the channel of the plurality of 5 GHz radio channels.

20. The system of claim 17 further comprising the dynamic frequency selection (DFS) device and forming a closed loop control system.

\* \* \* \* \*